US006963187B2

(12) United States Patent
Bebic et al.

(10) Patent No.: US 6,963,187 B2
(45) Date of Patent: Nov. 8, 2005

(54) HYBRID POWER FLOW CONTROLLER AND METHOD

(76) Inventors: Jovan Bebic, 706-485 Huron Street, Toronto, Ontario (CA), M3R 2R5; Peter Lehn, 155 Hillhurst Blvd., Toronto, Ontario (CA), M5N 1N7

( * ) Notice: Subject to any disclaimer, the term of this patent is extended or adjusted under 35 U.S.C. 154(b) by 26 days.

(21) Appl. No.: 10/695,902

(22) Filed: Oct. 30, 2003

(65) Prior Publication Data

US 2005/0015182 A1 Jan. 20, 2005

Related U.S. Application Data

(60) Provisional application No. 60/423,374, filed on Nov. 4, 2002.

(51) Int. Cl.$^7$ .............................. G05F 1/70; G05F 3/00
(52) U.S. Cl. ......................... 323/207; 323/205; 363/34
(58) Field of Search ................................ 323/205, 207, 323/208, 212; 363/34, 37

(56) References Cited

U.S. PATENT DOCUMENTS

| | | | |
|---|---|---|---|
| 5,343,139 A | 8/1994 | Gyugyi et al. | |
| 5,351,181 A | 9/1994 | Brennen et al. | |
| 5,698,969 A | 12/1997 | Gyugyi | |
| 5,751,138 A | 5/1998 | Venkata et al. | |
| 5,831,843 A * | 11/1998 | Lindberg et al. | 363/98 |
| 5,841,267 A | 11/1998 | Larsen | |
| 6,411,067 B1 * | 6/2002 | Bjorklund | 323/207 |
| 6,507,503 B2 * | 1/2003 | Norrga | 363/17 |
| 6,603,675 B1 * | 8/2003 | Norrga | 363/137 |

OTHER PUBLICATIONS

Gyugi, L., Solid-State Synchronous Voltage Sources for Dynamic Compensation and Real-Time Control of AC Transmission Lines, IEEE Emerging Practices in Technology, 1993, IEEE Standards Press, New Jersey, USA.

Hingorani, N., Flexible AC Transmission, IEEE Spectrum, Apr. 1993, p. 40–45 vol.: 30, Issue: 4, IEEE.

Hingorani, N., High Power Electronics and Flexible AC Transmission System, Power Engineering Review, Jul. 1988, p. 3–4, vol. 8, Issue 7, IEEE.

Ooi et al., "C–UPFC: A new FACTS controller with 4 degrees of freedom", IEEE Specialists Conference (Proceedings), Jun. 2000, p. 961–66, vol. 2, IEEE, Piscataway, NJ, USA.

Ojo et al., "Control of a Center–Node Unified Power Flow Controller in Transmission Line Applications", IEEE Pow. Electr. Specialists Conf., Jun. 2001, p. 545–554, IEEE, NY, NY.

\* cited by examiner

Primary Examiner—Bao Q. Vu

(57) ABSTRACT

A power flow controller for controlling the flow of active and reactive power on an AC transmission line between an input and output includes first and second power converters, coupled to each other to exchange active power and coupled to the input and output. A controller is coupled to the power converters and controls the converters to provide a controlled quantity of active power to the output, and draw this controlled quantity of active power from the input of the power flow converter. Electric current is diverted at a node between the input and the output, allowing independent control of currents at the input and output. In a preferred embodiment, the two power converters are interconnected in series. A controllable susceptance is connected in shunt at a node between the converters to divert the current.

25 Claims, 34 Drawing Sheets

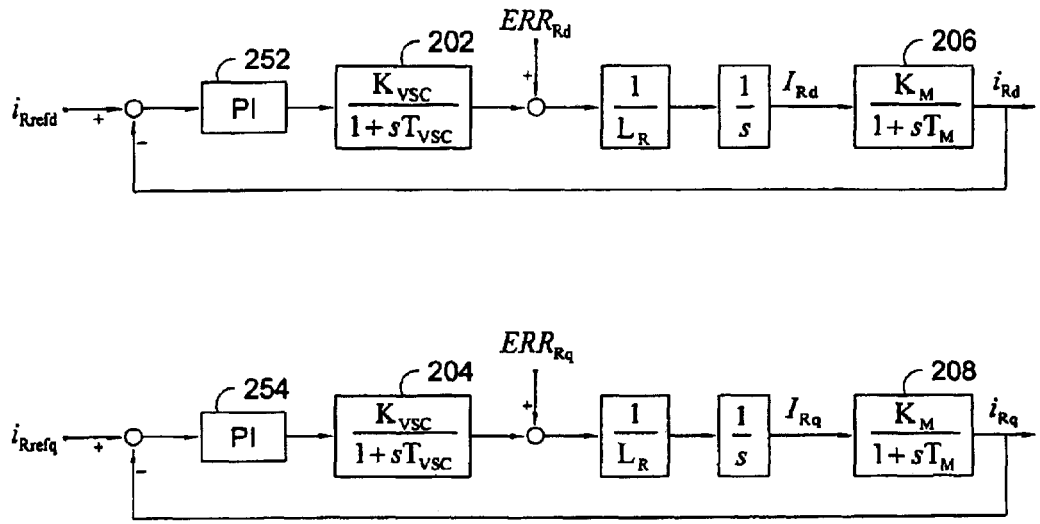
FIG. 19C
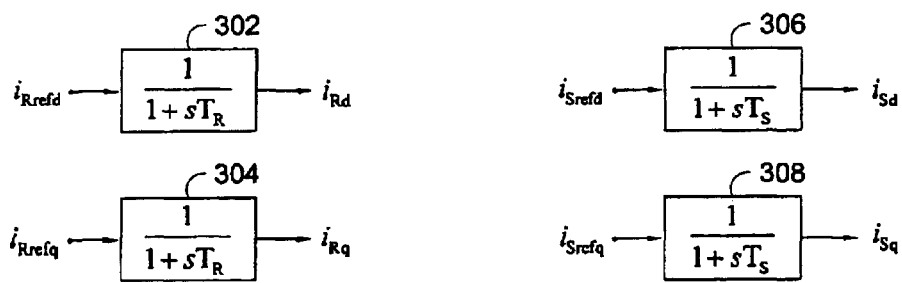
FIG. 19D  FIG. 19E

$$\omega\left(-v_{Mq} + v_{Mq}^0\right) = \lim_{t \to \infty} \frac{\omega}{b_M}\left(i_{Md} - b_M v_{Mq}\right)$$

$$\omega\left(v_{Md} - v_{Md}^0\right) = \lim_{t \to \infty} \frac{\omega}{b_M}\left(i_{Mq} + b_M v_{Md}\right)$$

HYBRID POWER FLOW CONTROLLER AND METHOD

CROSS-REFERENCE TO RELATED APPLICATION

This application claims benefit from U.S. Provisional Application No. 60/423,374, filed Nov. 4, 2002, the contents of which are hereby incorporated by reference herein.

FIELD OF THE INVENTION

The present invention relates generally to the control of the flow of power in an alternating current (AC) transmission system. In particular, it relates to a power flow controller and a method for controlling the flow of active and reactive power on an AC transmission line.

BACKGROUND OF THE INVENTION

Typically, electrical energy is not produced where it is consumed, so it is necessary to transmit power from generation centres (large power plants) to load centres (cities or industrial facilities). High voltage transmission systems transport electrical energy from its source to the point of consumption.

To ensure reliability of supply, and because of economic and other factors, it is common practice to interconnect transmission systems in different geographic or geopolitical regions. As a result, transmission systems are typically large and complex electrical circuits consisting of hundreds of generation/consumption nodes and thousands of transmission lines. Controlling the flow of power between the nodes in such complex circuits is a challenging problem. It is further complicated by the need to control the voltage at each node to within a small tolerance of a rated value.

Historically, there have been only a few approaches to control transmission systems. Node voltages were controlled by mechanically switched shunt connected capacitor or inductor banks, and the power flow through individual lines was controlled by changing taps on phase shifting transformers and by cancelling line inductance by switching capacitors in series with the line. As the operating life of mechanical switches is inversely proportional to the rate at which switching cycles are performed under load, control of transmission systems was limited to slow sequential reconfigurations designed to reach the desired steady state operating point for a given set of conditions. Dynamic control was not possible, and consequently transients initiated by faults, line and generator outages, or by equipment malfunction, were dealt with by operating the system conservatively and by a practice of over-design. This resulted in considerable underutilization of system capacity.

The advent of power grade thyristors in the early 1970s made it possible to improve upon the classical devices for controlling power systems. Thyristors can be described as one-way switches that begin to conduct when a pulse is sent to their gate. They stop conducting when the current is brought to zero. Thyristors were first used as replacements for mechanical switches, alleviating the problem of reduced operating life due to the number of switching cycles. Applications include thyristor switched capacitors and reactors, and thyristor-based phase angle regulators and tap changers.

Over time, owing to the ability of thyristors to delay the turn-on instant, more sophisticated circuit configurations emerged which allow continuous variation of compensator parameters, including static VAr compensators (SVCs) which allow continuous control of shunt connected reactance, and thyristor controlled series capacitors (TCSCs). Considerable deployment of static VAr compensators began in the mid-1970s and, to date, they are the most commonly used power system compensator. Although their ability to indirectly damp power system transients was recognized early on, traditional practices in system planning and operation dominated the industry throughout the 1970s, and the use of SVCs was limited largely to provide reactive power support.

A characteristic of the power industry is that the demand for power rises steadily, while system upgrades are implemented through large and costly projects. Over the years, energy, environmental, right-of-way, and cost problems have delayed the construction of both generation facilities and new transmission lines, so better utilization of existing power systems has become imperative. In the early 1980s, it was recognized that a change was needed in traditional practices in system planning and operation.

Concurrently, technological advancements in the semiconductor industry led to the production of a power grade gate turn-off thyristor (GTO). The GTO is functionally similar to the thyristor, but can also be turned off by sending a pulse to its gate. The commercial availability of GTOs in the mid-1980s made it possible to construct large voltage-sourced converters (VSCs). In principle, VSCs are capable of generating multiphase alternating voltage of controlled magnitude and phase. On one side they have switching elements (GTOs), and on the other they provide voltage support, typically by way of a DC capacitor.

The application of VSCs in the transmission industry became the subject of considerable research effort in the late 1980s and through the 1990s. The concept of flexible AC transmission system" (FACTS) was conceived, allowing power flow control through AC transmission lines using static converters. Devices used to accomplish this objective (of power flow control) are called FACTS controllers. Examples include the advanced static compensator (STATCOM), the series static synchronous compensator (SSSC), the unified power flow controller (UPFC), and the interline power flow controller (IPFC). A comprehensive review of all compensators, classical and modern, can be found in "Understanding FACTS: Concepts and Technology of Flexible AC Transmission Systems", Narain G. Hingorani, Laszlo Gyugyi, ISBN: 0-7803-3455-8 Wiley-IEEE Press, 1999, the contents of which are hereby incorporated by reference.

Analyzing the numbers of control degrees of freedom and constraints that have to be satisfied offers useful insights into the capabilities of different FACTS controllers. As explained above, VSCs can generate voltage of controllable magnitude and phase. This means that each VSC offers two independent degrees of freedom. When a single converter is interfaced to a transmission line, the two degrees of freedom available for voltage control can be transformed into freedom to control active and reactive power exchanged with the line. While the exchange of reactive power does not impose further limitations, drawing active power in steady state operation requires that the converter be equipped with an energy storage device, which, in most cases, is impractical. Hence, there is a constraint that, in steady state, a single converter must not exchange active power with the line.

STATCOM uses one VSC connected in shunt to the line. With the active power constraint imposed, the control of STATCOM is reduced to one degree of freedom, which is used to control the amount of reactive power exchanged with the line. Accordingly, STATCOM is operated as a functional equivalent of an SVC; it provides faster control than an SVC and improved control range.

An SSSC uses a VSC connected in series with the line. In this case, the active power constraint translates into a requirement that the voltage vector injected by the SSSC must at all times be perpendicular to the current vector. This means that an SSSC is equivalent to a controllable series reactance, i.e., an SSSC can be regarded as the functional equivalent of a TCSC. The SSSC offers faster control, and it is inherently neutral to sub-synchronous resonance.

A UPFC consists of two voltage-sourced converters that share a common DC capacitor. One converter is interfaced in series with the line and the other in shunt. The common DC circuit permits unrestricted exchange of active power between the converters so that active power absorbed from the line by one converter can be supplied to the line by the other. As a result, three degrees of freedom are available, or more precisely, there are four degrees of freedom with one constraint. The UPFC can be used to control the flow of active and reactive power through the line and to control the amount of reactive power supplied to the line at the point of installation.

In its basic configuration, an IPFC consists of two voltage sourced converters interfaced in series with two independent transmission lines. As in the UPFC configuration the converters share a common DC circuit that permits the exchange of active power. By injecting appropriate voltages into the lines, an IPFC can redirect the flow of active power from one line to another, while controlling the amount of reactive power. This concept can be extended without difficulty to N lines.

The shortcoming of all current FACTS controllers is their considerable price. At present, they are well beyond reach of many utilities. Moreover, it is arguable whether improvements in control performance achieved by STATCOM and SSSC justify the replacement of their thyristor-based counterparts. The core functionality provided by an IPFC can be largely accomplished by individual line control using classical compensators.

A UPFC offers control options substantially different from those of classical compensators. Nonetheless, due to the need for two converters, the investment required for UPFC installation discourages widespread deployment. Moreover, given its topology, the UPFC is a self-sufficient device, that is, it can make limited or no use of existing compensators, such as an SVC or switched capacitors.

It is therefore worthwhile to seek alternatives to the compensator that would build upon existing equipment and provide flexible power flow control.

SUMMARY OF THE INVENTION

Exemplary of the present invention, a power flow controller for controlling the flow of active and reactive power on an AC transmission line between an input and output includes first and second power converters, coupled to each other to exchange active power and coupled to the input and output. A controller is coupled to the power converters and controls the converters to provide a controlled quantity of active power to the output, and draw this controlled quantity of active power from the input of the power flow converter. Electric current is diverted at a node between the input and the output, allowing independent control of currents at the input and output.

In a preferred embodiment, the two power converters are interconnected in series. A controllable susceptance is connected in shunt at a node between the converters to divert the current.

In accordance with an aspect of the present invention, a desired amount of active power is provided from a first electrical region to a second electrical region. The method includes (i) diverting a current from the first region to an input of a first controlled voltage source, the input at an input voltage; (ii) adding to the input voltage, using the first controlled voltage source a first control voltage at a controlled amplitude and phase angle to provide an intermediate voltage at an output of the first controlled voltage source; (iii) diverting a current, from the output of the first controlled voltage source; (iv) adding to the intermediate voltage, using a second controlled voltage source a second control voltage at a controlled amplitude and phase angle to provide from an output of the second controlled voltage source a current to the second region; (v) providing active power for the second controlled voltage source from the first controlled voltage source; and (vi) controlling the first and second control voltages in magnitude and phase to provide the desired amount of active power to the second region, and so that substantially all active power provided to the first controlled voltage source is coupled to the second voltage source.

In accordance with another aspect of the present invention a controlled quantity of active electrical power is diverted from a first electrical region to a second electrical region. An exemplary method includes (i) providing the active electrical power to an input of a power flow controller; (ii) diverting a portion of the active electrical power provided to the input to a first power converter; (iii) providing a remaining portion of the active electrical power from the input to an output of the power flow controller; (iv) providing active power from the power converter to the output of the power flow controller and thereby to the second electrical region; (v) varying a phase angle of electrical current at the output relative to the input by providing current from the input to an intermediate node, and diverting a portion of the current at the intermediate node through a susceptance; and (vi) controlling the first power converter, so that the desired quantity of active electrical power is diverted from the first electrical region to the second electrical region.

In accordance with yet another aspect of the present invention, an electrical power flow controller includes an input and an output. First and second power converters are connected in series to each other between the input and output. A susceptance is connected in shunt to a node between the first and the second power converter. A controller is in communication with the first and second power converters. This controller controls the first and second power converters to provide a controlled quantity of active power to the output, and draw the controlled quantity of active power from the input.

In accordance with a further aspect of the invention, an electrical power flow controller includes an input and output. A reactance is connected in series between the input and the output. A first power converter is connected in shunt with the input. A second power converter is connected in shunt with the output. The first power converter coupled to provide active power to the second power converter. A controller is in communication with the first and second power converters. The controller controls the first and second power converters to provide a controlled quantity of active power from the output, and draw the controlled quantity of active power from the input.

In accordance with yet a further aspect of the present invention, a power flow control circuit for diverting electrical power from a first region to provide a controlled amount of active power to a second region, includes a first controllable voltage source providing a first controllable voltage between its input and its output. The input of the first controllable voltage source is for interconnection to the first region. A second controllable voltage source provides a second controllable voltage between its input and its output. This output is for connection to the second region. The output of the first controllable voltage source is connected to the input of the second controllable voltage source. An impedance is connected in shunt to a node between the output of the first power converting circuit. The second controllable voltage source is coupled to the first controllable voltage source to obtain active power from the first controllable voltage source. A controller is in communication with the first and second controllable voltage sources to control the first and second controllable voltages to provide the active power to the second region from power from the first region, and to couple substantially all active power provided to the first controlled voltage source to the second voltage source.

In accordance with another aspect of the present invention there is provided a method of compensating electrical losses in an electrical power flow controller. The power flow controller includes first and second power converters for diverting a controlled quantity of active electrical power from a first electrical region to an input of the power flow controller and from an output of the power flow converter to a second electrical region. The first and second power converters are coupled to each through an energy storage device to exchange energy between the first and second power converters. The method includes controlling current to the input to maintain an energy stored in the energy storage device, thereby compensating for losses in the electrical power flow controller.

Exemplary power flow controllers may be consider "hybrid" power flow controllers as controlled power converters are combined with passive components (e.g. susceptance, reactance, etc) to control the flow of power.

Other aspects and features of the present invention will become apparent to those of ordinary skill in the art upon review of the following description of specific embodiments of the invention in conjunction with the accompanying FIGS.

BRIEF DESCRIPTION OF THE DRAWINGS

In the FIGS. which illustrate by way of example only, embodiments of the present invention.

DETAILED DESCRIPTION

Figure 1:
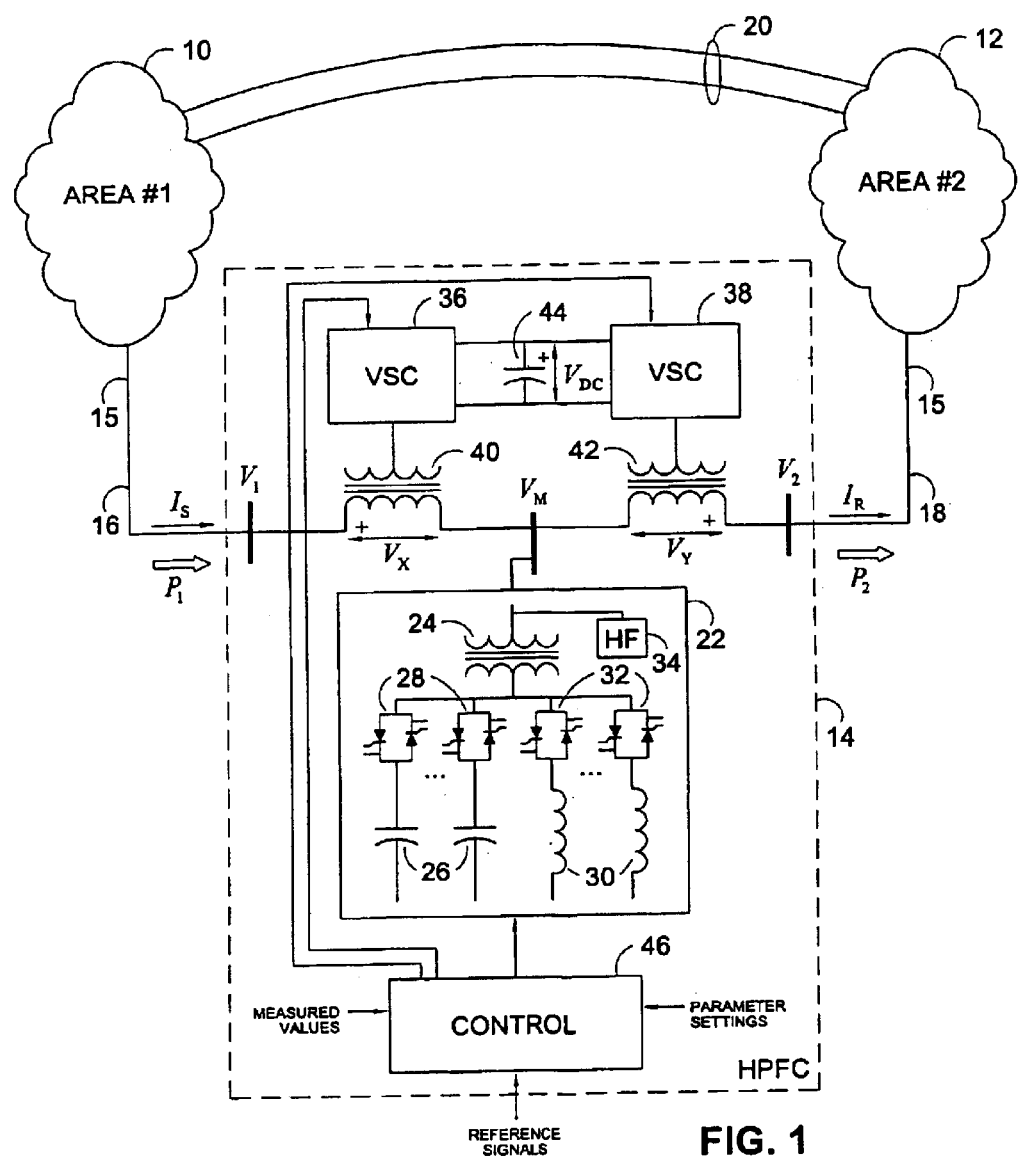
FIG. 1 illustrates two electrical regions, interconnected by a power flow controller, exemplary of an embodiment of the present invention.

A single line diagram of an electrical power transmission system connecting two electrical regions 10 and 12, is illustrated in FIG. 1. A power flow controller 14, exemplary of an embodiment of the present invention, is installed on one transmission path 15 that connects region 10 with region 12. Each region 10 or 12 may be considered an area of electrical power production and/or power consumption. The transmission path 15 between regions 10 and 12 is thereby divided into two segments: segment 16 connecting area 10 to the power flow controller 14 and segment 18 connecting the power flow controller 14 to area 12. Other, parallel, transmission paths 20 may also exist between the areas 10 and 12.

Segments 16 and 18 are three-phase transmission lines carrying three phase alternating currents. The current flowing in the given phase of line segment 16 is denoted $I_S$, and the current in the given phase of segment 18 is denoted $I_R$. The line to neutral voltage at the point of connection of the line segment 16 to the power flow controller 14 is labeled $V_1$. Voltage at the point of connection of line segment 18 to the power flow controller 14 is labeled $V_2$. Transmission line segments 16 and 18 both have substantial length which are generally unequal.

Exemplary power flow controller 14 includes the power circuit of a shunt connected three-phase variable susceptance 22. The line to neutral voltage at the high voltage terminals of variable susceptance 22 is $V_M$. The power circuit for variable susceptance 22 includes a transformer 24, one or more branches of capacitive susceptance 26 switchable by controllable switches 28, one or more branches of inductive susceptance 30 switchable or controllable by controllable switches 32, and an optional harmonic filter 34. A person of ordinary skill in the art will appreciate that the controllable switches 28 and 32 can be implemented using semiconductor based switches, as well as mechanical switches. Some examples of semiconductor-based controllable switches are SCRs (as shown in FIG. 1), GTOs, or a combination of a diode bridge and a high voltage transistor. Moreover, those experienced in the art will appreciate that the variable susceptance 22 is equivalent to a typical static VAr compensator (SVC). Therefore, it is apparent that functional equivalents of an SVC can be successfully employed in place of variable susceptance 22. Some widely known equivalents of an SVC include a STATCOM, a synchronous condenser, and even a mechanically switched capacitor bank.

Power flow controller 14 further includes two voltage-sourced converters 36 and 38. Each of the converters 36, 38 may include multiple six-pulse converters interconnected by interstage transformers to form higher order pulse groups. An excellent review of voltage-sourced converter concepts can be found in "Understanding FACTS: Concepts and Technology of Flexible AC Transmission Systems", supra. Converter 36 is connected in series with line segment 16 by transformer 40. Converter 38 is connected in series with line segment 18 by way of transformer 42. Converters 36 and 38 share a common DC circuit, coupling each other's DC terminals. Voltage support at the DC terminals is provided by capacitor 44. A person of ordinary skill in the art will readily appreciate that voltage-sourced converters as used as converters 36 and 38 in the described embodiment, are merely a preferred choice. Ultimately converters 36 and 38 provide controllable voltages at terminals of high voltage side of transformers 40 and 42 (i.e., voltages $V_X$ and $V_Y$ in FIG. 1) while providing a path for active power exchange between the two converters. As such, there are many equivalent circuit configurations that may be used in place of the described converters 36 and 38; for example current-sourced converters with a DC circuit employing an inductor may be used; an AC to AC converter may be used. As will become apparent, other machine-based alternatives may also be used. Yet other alternatives will be apparent to a person of ordinary skill.

Finally, programmable controller 46 provides control signals required for operation of variable susceptance 22 and control signals for operation of converters 36 and 38 of power flow controller 14, as detailed below. In FIG. 1 inputs to the controller 46 are divided into three groups. Reference signals are supplied by the system operator and they represent the desired operating points for the line segments 16 and 18. Parameter settings provide information about the system and about ratings of the installed power circuits. Measured values are the signals proportional to locally accessible currents and voltages. These signals are used for closed loop real time control of the power circuits, as described below.

Figure 2:
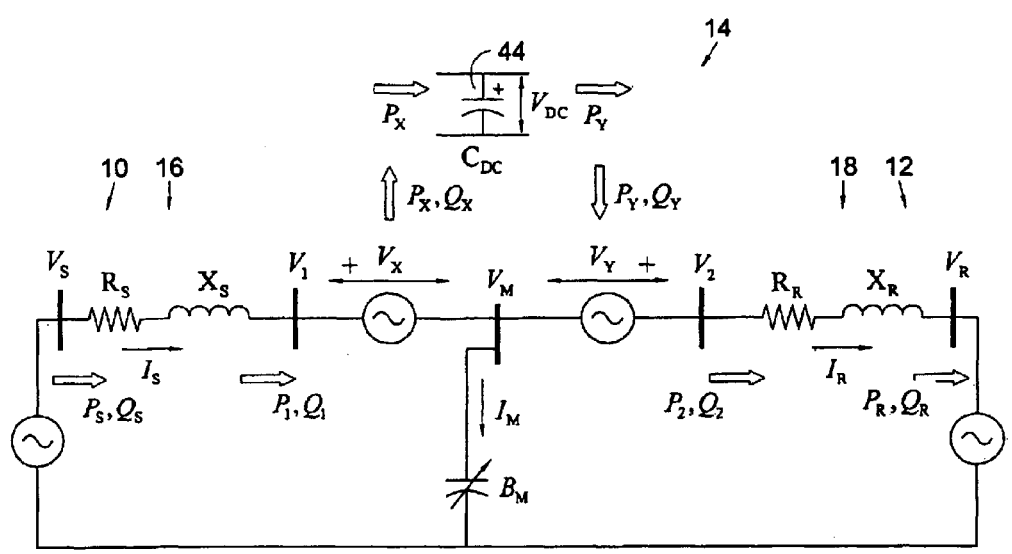
FIG. 2 is a simplified single phase equivalent of the power flow controller of FIG. 1.

Simplified single-phase equivalent circuit of power flow controller 14 and interconnected electrical regions 10, 12 and line segments 16, 18 are shown in FIG. 2. Electrical region 10 is represented by its Thévenin equivalent voltage source $V_S$. Variable $V_S$ denotes the instantaneous value of line to neutral voltage in the phase under consideration. Other voltages have analogous meanings. Values of parameters $R_S$ and $X_S$ are largely dominated by the parameters of the line segment 16, but also include the Thévenin equivalent of the source impedance representing area 10 and the leakage parameters of the transformer 40 (FIG. 1). Values: $V_R$, $R_R$ and $X_R$ are analogous representations of region 12 and line segment 18. Indexes "S" and "R" are used to identify "sending" and "receiving" end of the line and line segments 16 and 18 connected to these ends of the line, respectively. Voltage labels $V_1$, $V_2$, $V_M$ reflect voltages illustrated in FIG. 1. Voltage sources $V_X$ and $V_Y$ represent the high voltage equivalents of voltages generated by the converters 36 and 38, respectively. The variable capacitance labeled $B_M$ represents the controllable shunt connected variable susceptance 22. The range of values this parameter can assume depends on the installed power components; in general case $B_M$ can be positive (capacitive), zero, or negative (inductive).

Active and reactive powers of converters 36, 38, and areas 10 and 12, are respectively labeled $P_X$, $Q_X$; $P_Y$, $Q_Y$; $P_S$, $Q_S$; and $P_R$, $Q_R$, in FIG. 2. These powers represent respective three phase values. This is required for correct interpretation of charging and discharging of the DC capacitor 44, labelled $C_{DC}$ in FIG. 2. The polarities defined in FIG. 2, will be used hereinafter for mathematical description of the system.

To better understand the operation of exemplary power flow controller 14, FIGS. 4, 6, 7A–7F; 8A–8F; 9A–9C; 10A–10G; and 11A–11F illustrate example vectors corresponding to voltages and currents measurable at or within power flow controller 14, represented in the d-q plane.

Figure 3:
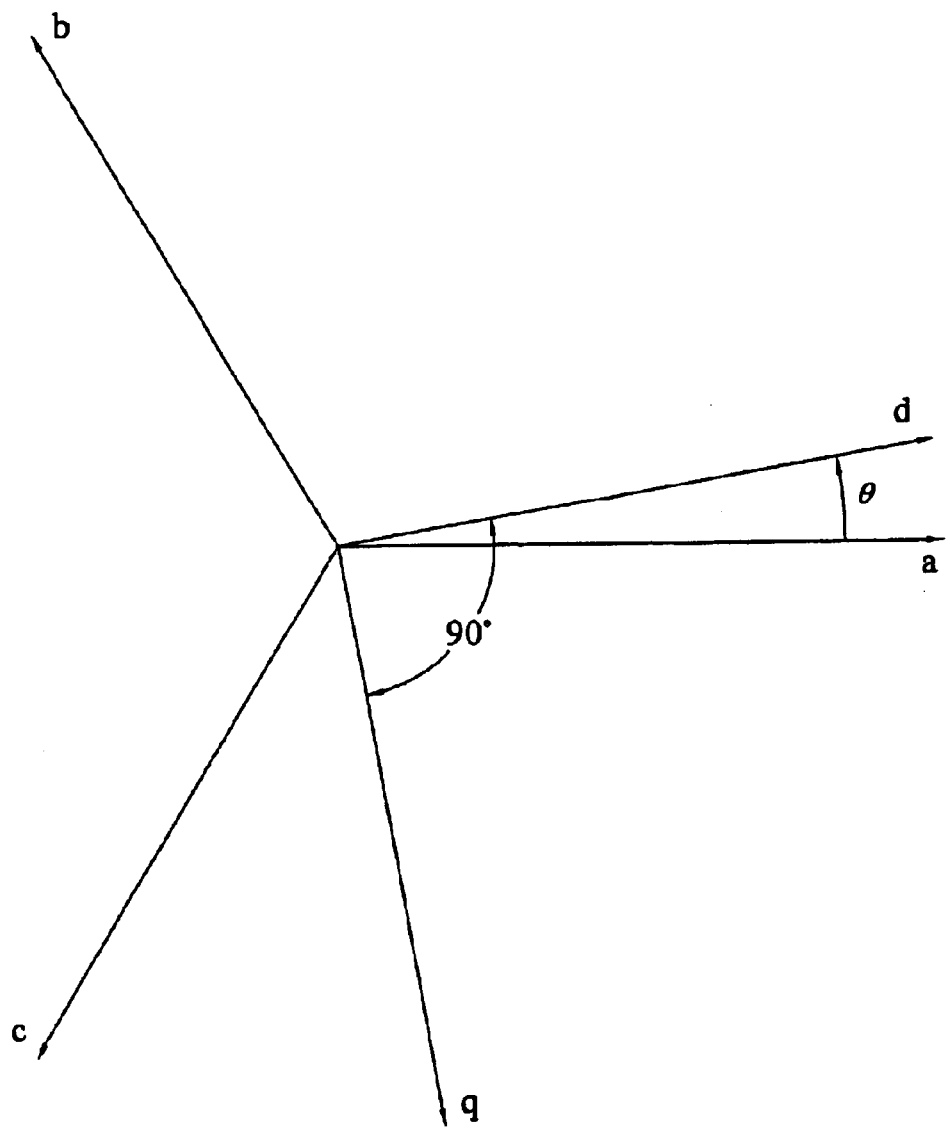
FIG. 3 illustrates a rotating reference frame for measuring voltages and currents.

To better appreciate these FIGS., FIG. 3 illustrates a rotating reference frame used in FIGS. 4, 6, 7A–7F; 8A–8F; 9A–9C; 10A–10G; 11A–11F. That is, in power system studies it is common to consider voltages and currents using a rotating reference frame. The orientation of axes and the direction of rotation are depicted in FIG. 3. In FIG. 3, the following applies:

$$\vec{F}_{dq0} = K_{abc2dq0} \vec{F}_{abc} \quad (1)$$

$\vec{F}$ are vectors of instantaneous values of current or voltage in the corresponding frame, that is, $F_{abc}$ represents a vector of instantaneous values of current or voltage in "abc" frame of reference, and $F_{dq0}$ represents a corresponding vector of instantaneous values of current or voltage in "dq0" frame of reference. Transformation matrix $K_{abc2dq0}$ is given by:

$$K_{abc2dq0} = \frac{2}{3} \begin{bmatrix} \cos(\theta) & \cos\left(\theta - \frac{2\pi}{3}\right) & \cos\left(\theta - \frac{4\pi}{3}\right) \\ \sin(\theta) & \sin\left(\theta - \frac{2\pi}{3}\right) & \sin\left(\theta - \frac{4\pi}{3}\right) \\ \frac{1}{\sqrt{2}} & \frac{1}{\sqrt{2}} & \frac{1}{\sqrt{2}} \end{bmatrix} \quad (2)$$

As will be appreciated by persons of ordinary skill, a motivation for using the rotating frame of reference comes from the theory of AC machines. Namely, if phase shifted currents of the same frequency are run through the spatially distributed windings of the machine, the resulting magnetomotive force (MMF) in the air gap of the machine creates the rotating magnetic field. Defining a reference frame that rotates at the same speed provides a tool to study interactions of vector of magnetic field with other pertinent vectors in a frame of reference where components of these vectors are constant in steady state. This greatly simplifies the design of real time controllers, as these controllers can now operate on DC quantities, rather than on sinusoidally varying quantities observed in the windings.

In normal operation of power system algebraic sums of phase currents and voltages, that is, zero sequence components of these variables, are negligibly small and can be neglected in the analysis. Consequently, the three scalar quantities from "abc space" can be reduced to one vector in "dq space" without loss of information, and the behavior of the system can be studied using vector diagrams in the plane. Detailed discussion of rotational frames of reference can be found in "Analysis of Electric Machinery" (Paul C. Krause, McGraw-Hill 1986).

Figure 4:
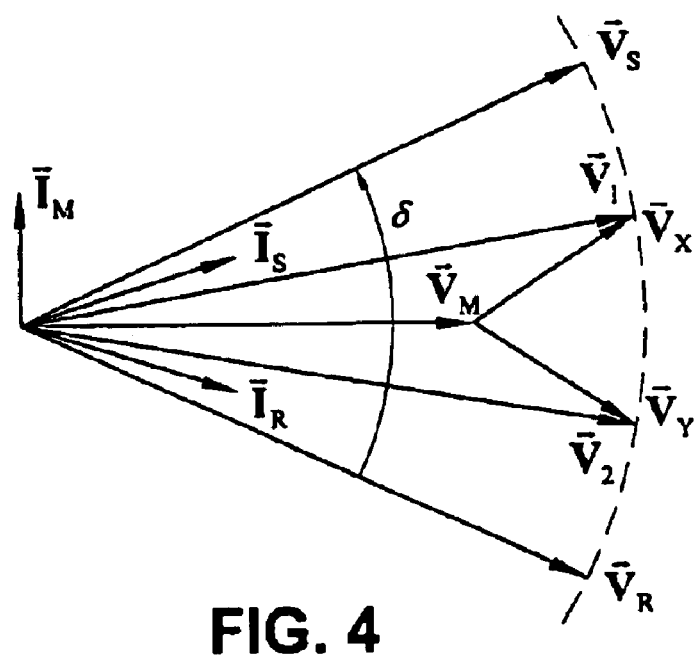
FIGS. 4; 6; 7A–7F; 8A–8F; 9A–9C; 10A–10G; 11A–11F; and 25A illustrate example voltage and current vectors in the power flow controller of FIG. 1 in the reference frame of FIG. 3.

A vector diagram, in d-q reference frame, representing one possible steady state operating point of the line controlled by the power flow controller 14 is shown in FIG. 4. For clarity, losses are neglected. Subscripts "dq" on all vectors are understood and therefore omitted. Corresponding voltages $\vec{V}_S$ and $\vec{V}_R$ identified in FIGS. 1 and 2 are shown as d-q vectors of equal magnitude, and with a certain angular difference between them. A person of ordinary skill in the art will readily appreciate that power flows in a transmission system are largely determined by angular differences between respective region voltages and by line impedances interconnecting the areas. Magnitudes of the voltages in any given area are actively regulated to be equal to their rated values by supplying reactive voltage support where needed. For the purpose of this discussion, voltages $\vec{V}_S$ and $\vec{V}_R$ are considered to be "strong busses", that is, the dynamics of change of their magnitudes and relative position are significantly slower than the dynamics of the controlled line.

If regions 10 and 12 were directly interconnected, by line 15 without power flow controller 14, the natural power transfer between $\vec{V}_S$ and $\vec{V}_R$ would be given by the well-known formula:

$$P_0 = 1.5 \frac{|\vec{V}_S||\vec{V}_R|}{X_S + X_R} \sin(\delta)$$

where $\delta$ represents the angle between the two voltages, as marked in the FIG. 4. As noted, $X_S$ and $X_R$ are the Thévenin equivalent impedances of lines 16 and 18 and regions 10, 12; and 1.5 is the constant of proportionality pertinent to the transformation of coordinates. In manners exemplary of embodiments of the present invention, power flow controller 14 changes this naturally occurring power transfer. Voltages and currents depicted in FIG. 4 correspond to a power flow lower than $P_0$. In simplest terms this is achieved by injecting voltages $\vec{V}_X$ and $\vec{V}_Y$, so as to reduce the angular differences between $\vec{V}_S$ and $\vec{V}_1$, and $\vec{V}_2$ and $\vec{V}_R$, respectively.

Figure 5:
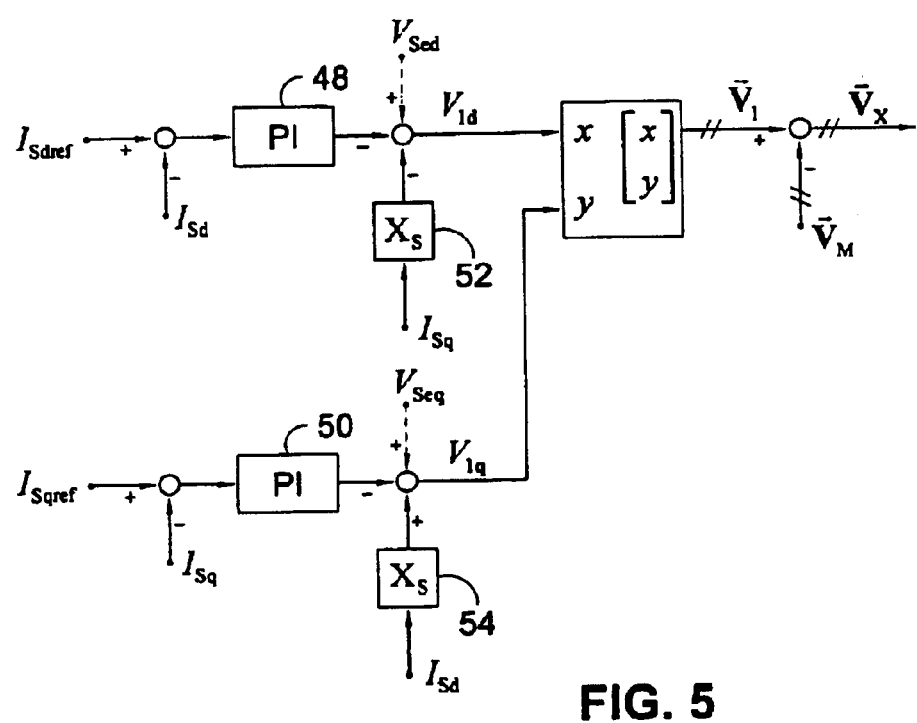
FIG. 5 illustrates a simplified closed loop controller.
Figure 6:
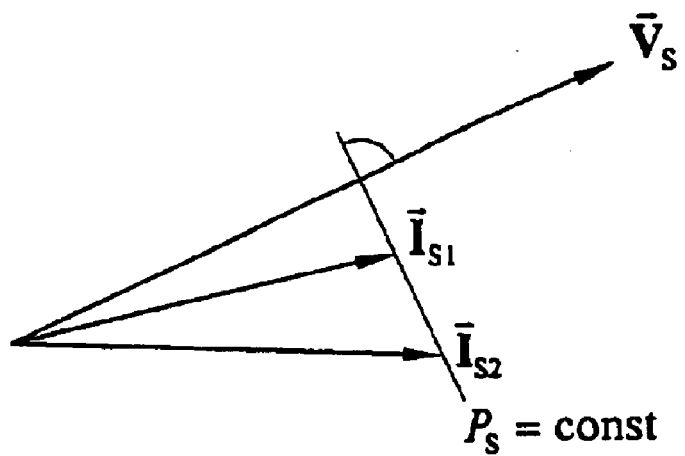

A useful insight into the circuit operation can be gained if the entire power flow controller 14 is viewed as a black box with two sets of external voltage terminals $\vec{V}_1$ and $\vec{V}_2$. With such representation, voltages $\vec{V}_1$ and $\vec{V}_2$ can be considered as mechanism by which to control the currents $\vec{I}_S$ and $\vec{I}_R$, respectively. In power flow controller 14 of FIG. 1, these voltages are subject to numerous constraints (described below). If these constraints did not exist, the circuit of FIG. 2 could be replaced by two independent sub-circuits: one including voltage source $\vec{V}_S$, line segment 16 and voltage source $\vec{V}_1$; and the other, including voltage source $\vec{V}_2$, line segment 18, and voltage source $\vec{V}_R$. Current provided by these independent circuits could then be independently controlled using two conventional controllers. An example controller suitable for closed loop control of $\vec{I}_S$ is illustrated in FIG. 5. Such a controller employs independent PI voltage regulators 48 and 50 in d and q axes, respectively. Appropriate current errors are brought to the inputs of PI elements. The corresponding outputs are used for calculations of $V_{Id}$ and $V_{Iq}$, that is, the desired components of vector $\vec{V}_1$. Cross coupling between the axes is eliminated by subtraction and addition of algebraic terms 52 and 54. Estimates, or measured values, of sending end voltage components $V_{Sed}$ and $V_{Seq}$ can be included as shown in dashed lines. Including these values eliminates a considerable DC bias from integral elements in 48 and 50. Once the value for $\vec{V}_1$ is generated, a vector subtraction of $\vec{V}_M$ yields the required value for $\vec{V}_X$. Finally, the required value for $\vec{V}_X$ can be obtained directly by the converter 36. An analogous controller could be designed for the closed loop control of $\vec{I}_R$ in the second sub-circuit.

Power flow controller 14, of FIG. 1, however, controls current vectors (i.e. magnitude and phase) through the respective line segments 16 and 18 while observing existing constraints and limit conditions on the various parameters. So, one may now consider constraints applicable to power flow controller 14.

Common DC circuit formed of capacitor 44 connecting converters 36 and 38 permits unrestricted power exchange between the converters. With polarities shown in FIG. 2, positive value of $P_X$ results in the positive charging current for the DC capacitor 44, while positive value of $P_Y$ results in the negative charging current. The differential equation describing the dynamics of $V_{DC}$ is:

$$C_{DC} \frac{dV_{DC}}{dt} = \frac{1}{V_{DC}} (P_X - P_Y) \quad (3)$$

In steady state $V_{DC}$ remains constant, therefore, $$P_X = P_Y \quad (4)$$

or, differently formulated and after cancellation of the proportionality factor, that:

$$\vec{V}_X \cdot \vec{I}_S = \vec{V}_Y \cdot \vec{I}_R \quad (5)$$

The product operator in equation (5) has the meaning of scalar product in the dq plane.

Next, due to the finite converter ratings, magnitudes of voltages $\vec{V}_X$ and $\vec{V}_Y$ as well as magnitudes of permissible currents $\vec{I}_S$ and $\vec{I}_R$ are limited. Voltage ratings of components constituting the variable susceptance require that the magnitude of $\vec{V}_M$ be limited. Finally, insulation requirements for the line segments 16 and 18 require that the magnitudes of $\vec{V}_1$ and $\vec{V}_2$ be limited.

The operating limit conditions may be summarized for easy reference:

$$|\vec{V}_X| \leq V_{Xmax} \quad (6)$$

$$|\vec{V}_Y| \leq V_{Ymax} \quad (7)$$

$$|\vec{I}_S| \leq I_{Xmax} \quad (8)$$

$$|\vec{I}_R| \leq I_{Ymax} \quad (9)$$

$$|\vec{V}_M| \leq V_{Mmax} \quad (10)$$

$$|\vec{V}_1| \leq V_{1max} \quad (11)$$

$$|\vec{V}_2| \leq V_{2max} \quad (12)$$

With these constraints, finding permissible steady state solutions allowing transfer of a selected amount of power $P_S$ caused by power flow controller 14 of FIG. 1 is a challenging problem. This is attributable, at least in part, to the condition of equal power exchange between the converters given by equation (4). This, in turn, introduces nonlinearity into the mathematical description of power flow controller 14. To assess permissible steady state operating states of power controller 14 numerically, it is therefore desirable to first position the state variables of power flow controller 14 at or near the manifold defined by equation (4), and, thereafter, use the remaining degrees of freedom to find the desired steady state solutions.

As should now be apparent voltage vectors $\vec{V}_X$ and $\vec{V}_Y$ may be used as control variables for closed loop control of power flow controller 14. This means that through the transients their values will be changing abruptly and in general case independent of each other. Thus, it is advantageous to seek a more invariant formulation for the condition of power balance than the one using these voltages.

The black box representation of the power flow controller 14 is again useful. The condition given by equation (4) stipulates the constant stored energy in the DC capacitor 44.

Furthermore, total energy stored in the three-phase susceptance 22 is, in steady state, constant. Therefore, if losses are neglected, the condition (4) may be replaced by the condition $P_1=P_2$. While improved, this formulation still does not provide the desired degree of invariance as it is dependent on voltage vectors $\vec{V}_1$ and $\vec{V}_2$. The ultimate formulation is obtained by recognizing that if line segments 16 and 18 are lossless, $P_S=P_1$ and $P_2=P_R$. Hence, for a lossless system the condition given by equation (4) can be expressed as:

$$P_S=P_R \quad (13)$$

or, as:

$$\vec{V}_S \cdot \vec{I}_S = \vec{V}_R \cdot \vec{I}_R \quad (14)$$

It is advantageous to provide a geometric interpretation for this condition. This may be appreciated with reference to FIG. 6. For a given vector $\vec{V}_S$, sending end power $P_S$ is proportional to the projection of $\vec{I}_S$ onto $\vec{V}_S$. Therefore, current vectors $\vec{I}_{S1}$ and $\vec{I}_{S2}$ transfer the same sending end power, as would any other current vector that has its tip on the same line perpendicular to $\vec{V}_S$. This line may be considered a "constant power line". Hence, the constant power line gives the loci of solutions for current $\vec{I}_S$ that couple specified value of active power $P_S$ from the voltage source $\vec{V}_S$. An analogous constant power line representing solutions for $\vec{I}_R$ can be constructed perpendicular to voltage vector $\vec{V}_R$. The condition of power balance between the converters can hence be expressed as the requirement to seek the solutions for vectors $\vec{I}_S$ and $\vec{I}_R$ that reside on the specified matching set of constant power lines.

Geometrically, each of limit conditions (6)–(12) represents the upper limit for magnitude of the respective voltage or current vector. As will be appreciated, these limits significantly affect the permissible steady state operating points of power flow controller 14.

It is now possible to formulate a procedure for construction of permissible steady state vector diagrams representing states of operation of power flow controller 14. The procedure will be illustrated on an example of the lossless power flow controller 14, with an assumed point of installation midway between region 10 and 12 (i.e. in the middle of the line connecting these regions). In terms of circuit parameters defined in FIG. 2, these simplifications can be described as:

$$R_S=R_R=0 \quad (15)$$

$$X_S=X_R \quad (16)$$

Figure 7A:
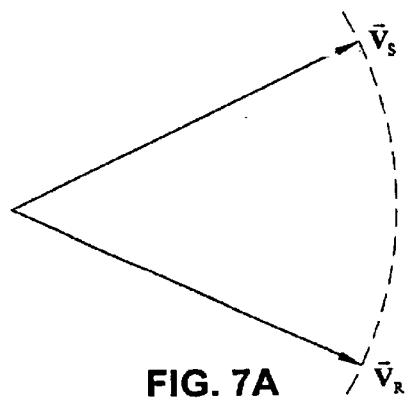
Figure 7B:
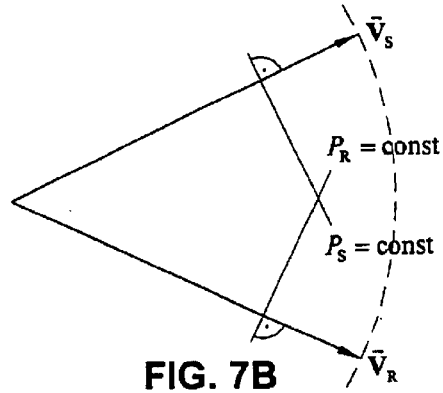
Figure 7C:
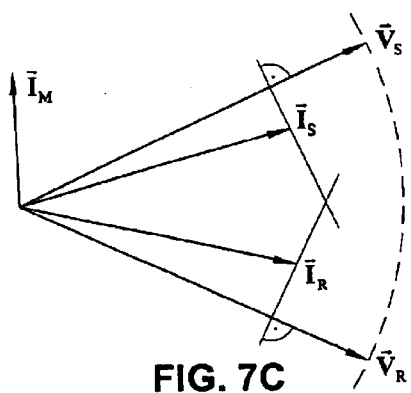

FIGS. 7A–7F graphically demonstrate exemplary steps of the procedure. In FIG. 7A voltage vectors $\vec{V}_S$ and $\vec{V}_R$ are shown. A pair of equal power lines corresponding to the desired power flow $P_S$ and $P_R$ is added in FIG. 7B. Next, current vectors $\vec{I}_S$ and $\vec{I}_R$ are chosen so that their tips lie on the corresponding equal power lines. There is hence one degree of freedom in choosing the location for each vector. This degree of freedom can be viewed as freedom to select the amount of reactive power supplied from the corresponding line end. For example, the choice of vector $\vec{I}_S$ uniquely specifies the values of $P_S$ and $Q_S$. The converse is also true, specifying the values for $P_S$ and $Q_S$ uniquely specifies the value of $\vec{I}_S$. Choice of current vectors $\vec{I}_S$ and $\vec{I}_R$ and the resulting $\vec{I}_M$ is shown in FIG. 7C. Once the vectors $\vec{I}_S$ and $\vec{I}_R$ are specified, voltages $\vec{V}_1$ and $\vec{V}_2$ are determined from:

$$V_{1d}=V_{Sd}-X_S I_{Sq}$$

$$V_{1q}=V_{Sq}+X_S I_{Sd} \quad (17)$$

$$V_{2d}=V_{Rd}+X_R I_{Rq}$$

$$V_{2q}=V_{Rq}-X_R I_{Rd} \quad (18)$$

Expressed in matrix form equations (17) and (18) are:

$$\vec{V}_1 = \vec{V}_S - \begin{bmatrix} 0 & X_S \\ -X_S & 0 \end{bmatrix} \vec{I}_S \quad (19)$$

$$\vec{V}_2 = \vec{V}_R + \begin{bmatrix} 0 & X_R \\ -X_R & 0 \end{bmatrix} \vec{I}_R \quad (20)$$

Figure 7D:
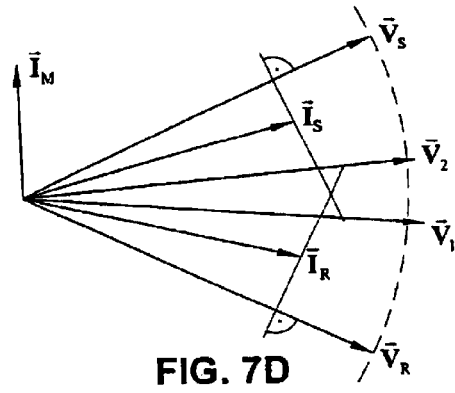

Corresponding vectors $\vec{V}_1$ and $\vec{V}_2$ are shown in FIG. 7D. Next, voltage $\vec{V}_M$ is determined based on known values of $\vec{I}_M$ and $B_M$ using:

$$V_{Md} = -\frac{1}{B_M} I_{Mq}$$

$$V_{Mq} = \frac{1}{B_M} I_{Md} \quad (21)$$

Expressed in matrix form (21) is equivalent to:

$$\vec{V}_M = \begin{bmatrix} 0 & \frac{-1}{B_M} \\ \frac{1}{B_M} & 0 \end{bmatrix} \vec{I}_M \quad (22)$$

Figure 7E:
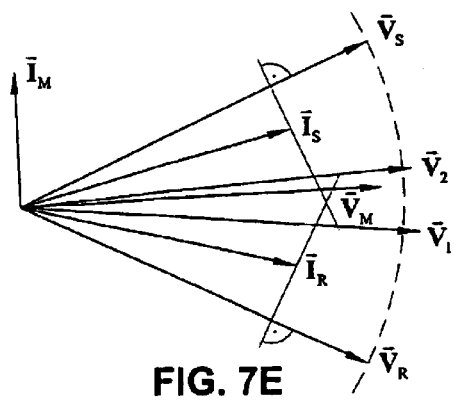

Resulting voltage $\vec{V}_M$ is shown in FIG. 7E. Finally, with known values for $\vec{V}_1$, $\vec{V}_2$, and $\vec{V}_M$, voltages $\vec{V}_X$ and $\vec{V}_Y$ are determined from:

$$\vec{V}_X=\vec{V}_1-\vec{V}_M$$

$$\vec{V}_Y=\vec{V}_2-\vec{V}_M \quad (23)$$

Figure 7F:
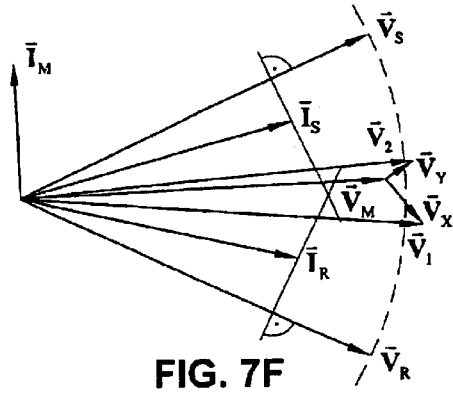

A complete vector diagram is shown in FIG. 7F. Limit conditions (6)–(12) can now be verified by simple measurements of relevant vector lengths and the solution can be accepted or dismissed based on this test.

Figure 8A:
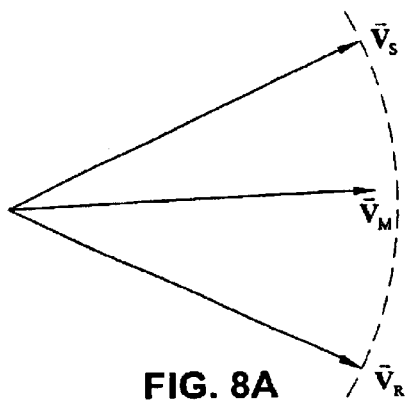
Figure 8B:
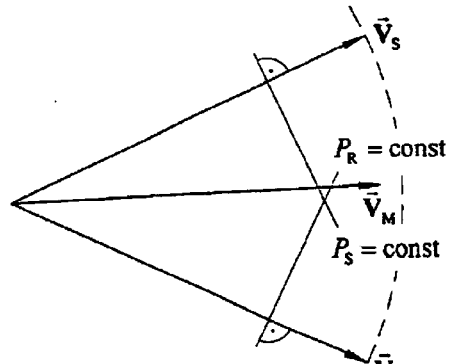
Figure 8C:
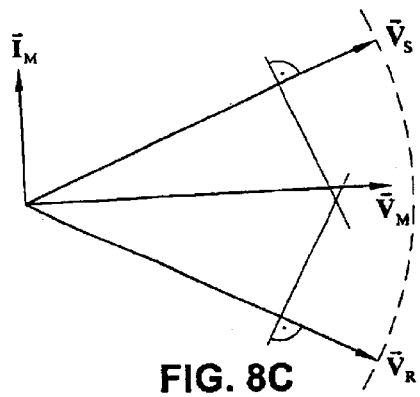
Figure 8D:
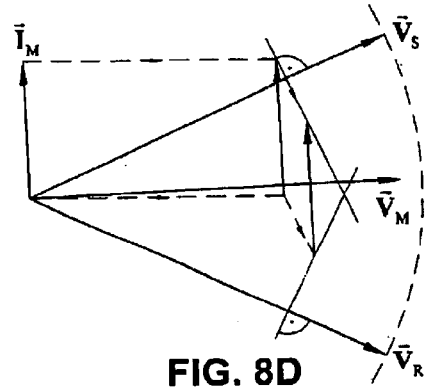
Figure 8E:
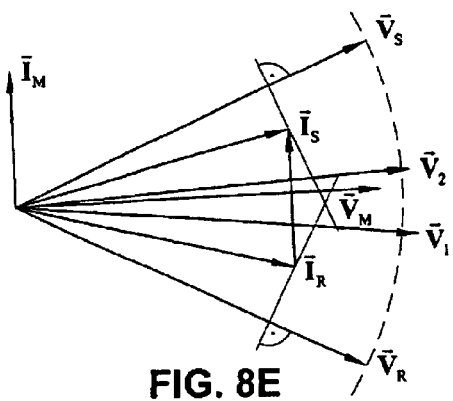
Figure 8F:
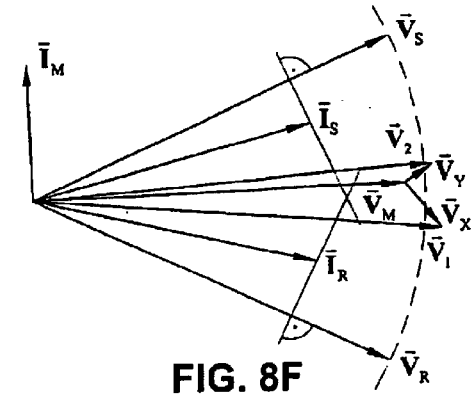

Of course, the above formulation is sensitive to the singularity occurring at $B_M=0$ in equations (21) and (22). An alternative formulation expressing $\vec{I}_M$ as a function of $\vec{V}_M$ is therefore favourable. The modified procedure starts by specifying the desired value for voltage $\vec{V}_M$. Steps of the modified procedure are illustrated in FIGS. 8A–8F. The desired value of $\vec{V}_M$ along with the known $\vec{V}_S$ and $\vec{V}_R$ is shown in FIG. 8A. A pair of constant power lines corresponding to the desired power transfer is added in FIG. 8B. Current $\vec{I}_M$ is uniquely determined from known values of $\vec{V}_M$ and $B_M$, and it is shown in FIG. 8C. Next, corresponding solutions for $\vec{I}_S$ and $\vec{I}_R$ are found by translating the vector $\vec{I}_M$ into a new position so that its tip lies on the equal power line perpendicular to $\vec{V}_S$, and its tail on the equal power line perpendicular to $\vec{V}_R$. This translation can be composed from two successive translations as shown in FIG. 8D. The first one translates the vector $\vec{I}_M$ to the position where its tip lies on the line $P_S$=const. The direction of the first translation is arbitrary, indicated by a pair of dashed lines. The second translation moves the resulting $\vec{I}_M$ along the line $P_S$=const, to the position where its tail lies on the line $P_R$=const. The tip of the resulting vector $\vec{I}_M$ coincides with the tip of the solution for $\vec{I}_S$, while its tail coincides with the tip of the solution for $\vec{I}_R$, as shown in FIG. 8E. Voltages $\vec{V}_1$ and $\vec{V}_2$, and the resulting $\vec{V}_X$ and $\vec{V}_Y$ are determined analogously to the previously described procedure. The final vector diagram is shown in FIG. 8F.

The procedure graphically illustrated in FIGS. 8A–8F can be generalized to compute the entire set of permissible steady state operating points. The steps of the generalized procedure may be appreciated through the following example applicable to power flow controller 14. For given $\vec{V}_S$ and $\vec{V}_R$, known circuit parameters, and specified value for $B_M$, one may find all pairs of $\vec{V}_X$ and $\vec{V}_Y$ that satisfy the constraint (4) and limit conditions (6) to (12), neglecting losses.

The solution can be obtained by trying all possible values for $\vec{V}_X$ and $\vec{V}_Y$ and dismissing the pairs that violate the constraint of power balance or any of the limit conditions. Such a trial and error approach, however, would have a small solution yield due to the fact that few combinations of vectors $\vec{V}_X$ and $\vec{V}_Y$ satisfy the condition of power balance. Consequently, to obtain sufficient number of admissible solutions a very fine trial grid could be used, and hence the procedure would not be computationally efficient. In addition, using such "brute force" approach would provide little insight into how particular limits affect the operating curves.

A more efficient procedure to compute the permissible steady state operating points is illustrated with reference to FIGS. 9A–9C; 10A–10G and 11A–11F. Assuming a lossless system with known circuit parameters $X_S$ and $X_R$, given $\vec{V}_S$ and $\vec{V}_R$, and specified $B_M$, $\vec{V}_M$ can be expressed as a function of $\vec{V}_X$ and $\vec{V}_Y$ as $$\vec{V}_M = a(\vec{V}_S - \vec{V}_X) + b(\vec{V}_R - \vec{V}_Y) \tag{24}$$

where:

$$a = \frac{X_R}{X_S + X_R} \frac{1}{1 - B_M \frac{X_S X_R}{X_S + X_R}} \quad \text{and} \tag{25}$$

$$b = \frac{X_S}{X_S + X_R} \frac{1}{1 - B_M \frac{X_S X_R}{X_S + X_R}} \tag{26}$$

It is apparent from equation (24) that the range of all possible solutions for $\vec{V}_M$ is a circle. The centre of this circle "M" has the coordinates:

$$M_d = aV_{Sd} + bV_{Rd}$$

$$M_q = aV_{Sq} + bV_{Rq} \tag{27}$$

The diameter "$D_M$" is given by:

$$D_M = 2(aV_{Xmax} + bV_{Ymax}) \tag{28}$$

Figure 9A:
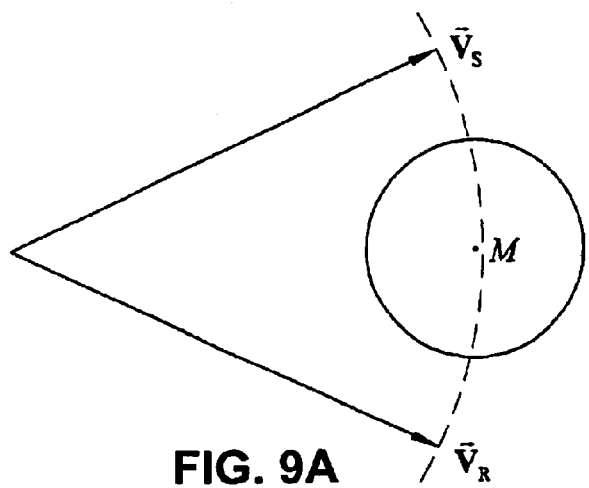
Figure 9B:
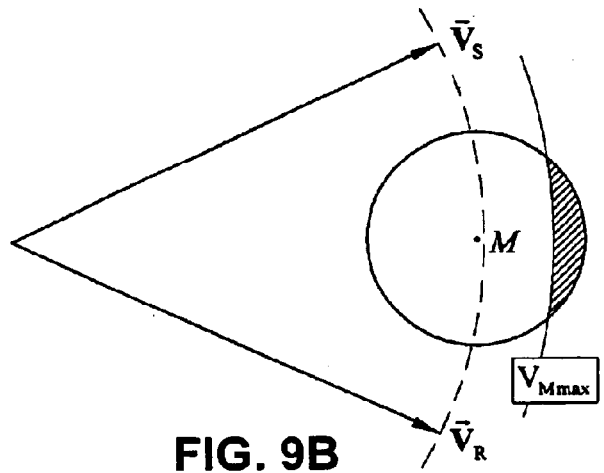
Figure 9C:
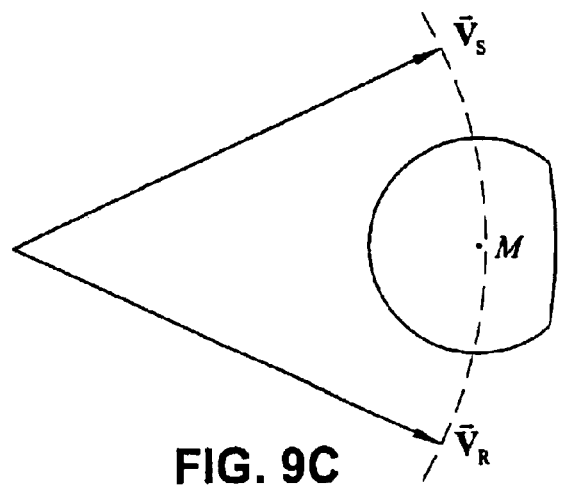

The circle and the corresponding vectors $\vec{V}_S$ and $\vec{V}_R$ are shown in FIG. 9A. Limit condition (10) can now be directly applied as shown in FIG. 9B. Solutions for $\vec{V}_M$ in the shaded area are to be dismissed as they violate the limit condition (10). The range of $\vec{V}_M$ that is to be further considered is shown in FIG. 9C. An arbitrarily fine grid can now be applied to the range of admissible solutions for $\vec{V}_M$, and the corresponding solutions for $\vec{V}_X$ and $\vec{V}_Y$ can be attempted for each value of $\vec{V}_M$ as follows.

Figure 10A:
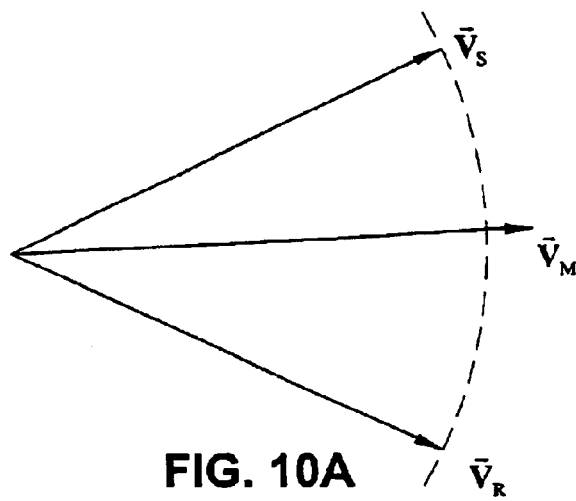

A particular value of $\vec{V}_M$ is shown in FIG. 10A relative to $\vec{V}_S$ and $\vec{V}_R$ of the problem. With values of $\vec{V}_M$ and $\vec{V}_S$ fixed, the current $\vec{I}_S$ is a function of only $\vec{V}_X$ and it is given by:

$$I_{Sd} = -\frac{1}{X_S}(V_{Sq} - V_{Mq} - V_{Xq}) \tag{29}$$

$$I_{Sq} = \frac{1}{X_S}(V_{Sd} - V_{Md} - V_{Xd})$$

Figure 10B:
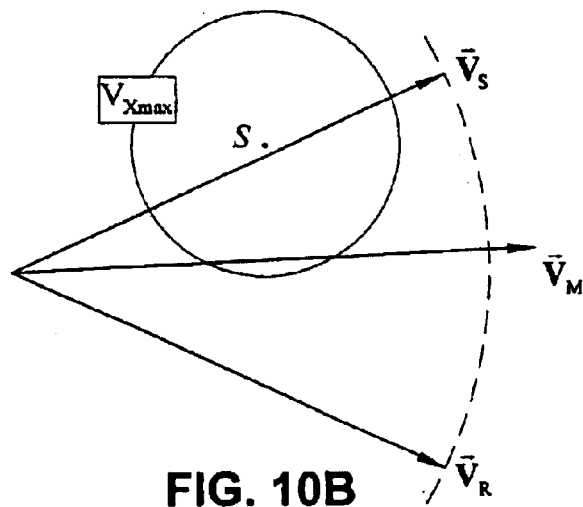

It can be deduced, from equations (29), that the range of values of $\vec{I}_S$ for varying $\vec{V}_X$ is a circle as shown in FIG. 10B. The center of the circle "S" has the coordinates:

$$S_d = -\frac{1}{X_S}(V_{Sq} - V_{Mq}) \tag{30}$$

$$S_q = \frac{1}{X_S}(V_{Sd} - V_{Md})$$

and its diameter "$D_S$" is given by:

$$D_S = \frac{2V_{Xmax}}{X_S} \tag{31}$$

Figure 10C:
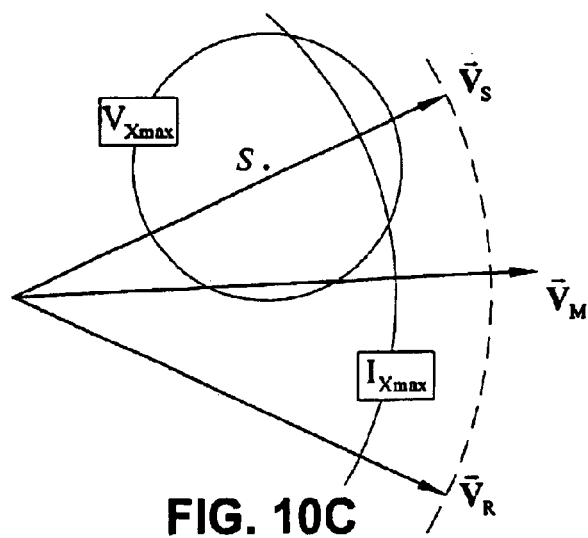

The limit condition (8) is added in FIG. 10C. Using equation (19) the limit condition (11) can also be represented as a circle in current space. It is centered at "$C_1$" given by:

$$C_{1d} = -\frac{1}{X_S}V_{Sq} \tag{32}$$

$$C_{1q} = \frac{1}{X_S}V_{Sd}$$

and its diameter "$D_1$" is:

$$D_1 = \frac{2V_{1max}}{X_S} \tag{33}$$

Figure 10D:
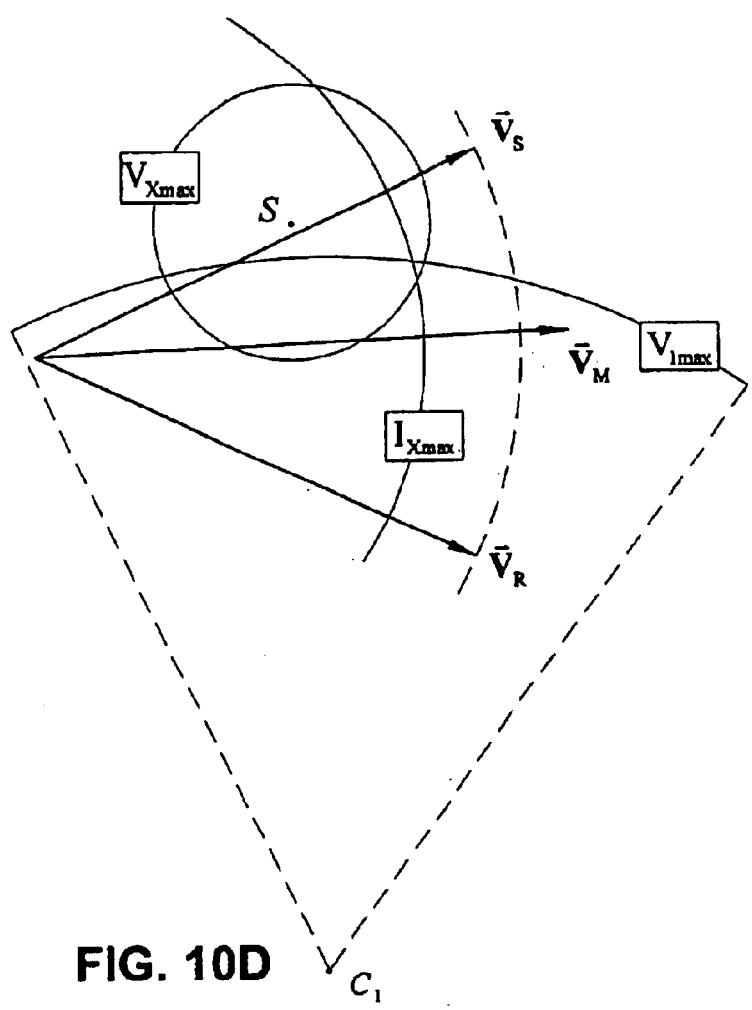
Figure 10E:
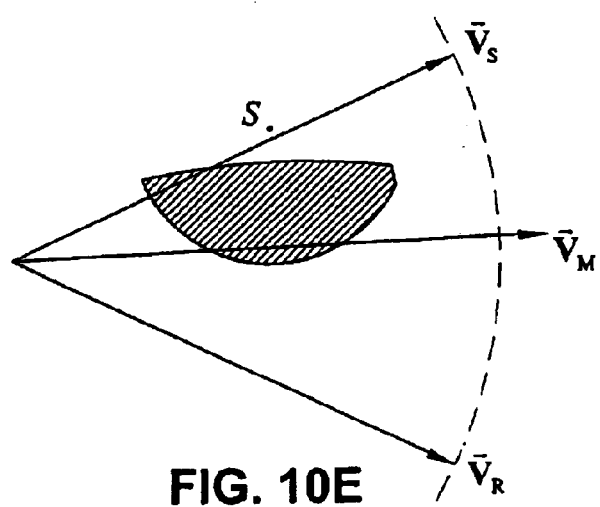

This circle is added in FIG. 10D. A range of admissible values for $\vec{I}_S$ that satisfy the limit conditions (6), (8), and (11) is the set of points obtained by intersecting the respective individual sets. The resulting set is shown as the shaded area in FIG. 10E.

Limit conditions (7), (9), and (12) have analogous geometric representation. The coordinates of the center and the diameter of the circle representing (7) are given as:

$$R_d = -\frac{1}{X_R}(V_{Mq} - V_{Rq}) \quad (34)$$

$$R_q = \frac{1}{X_R}(V_{Md} - V_{Rd})$$

$$D_R = \frac{2V_{Ymax}}{X_R} \quad (35)$$

The representation of limit condition (9) should be apparent—it is a circle centered in the origin with the radius equal to $I_{Ymax}$. The circle representing inequality (12) is centered at "$C_2$" with coordinates:

$$C_{2d} = \frac{1}{X_R}V_{Rq} \quad (36)$$

$$C_{2q} = -\frac{1}{X_R}V_{Rd}$$

and its diameter "$D_2$" is given by:

$$D_2 = \frac{2V_{2max}}{X_R} \quad (37)$$

Figure 10F:
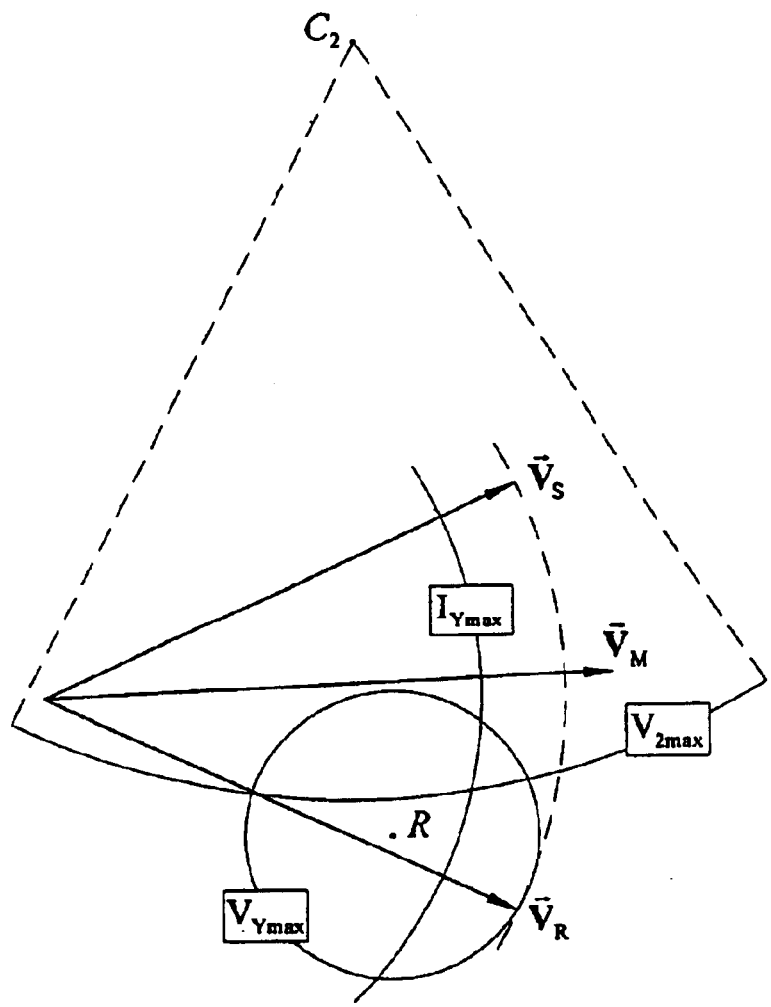
Figure 10G:
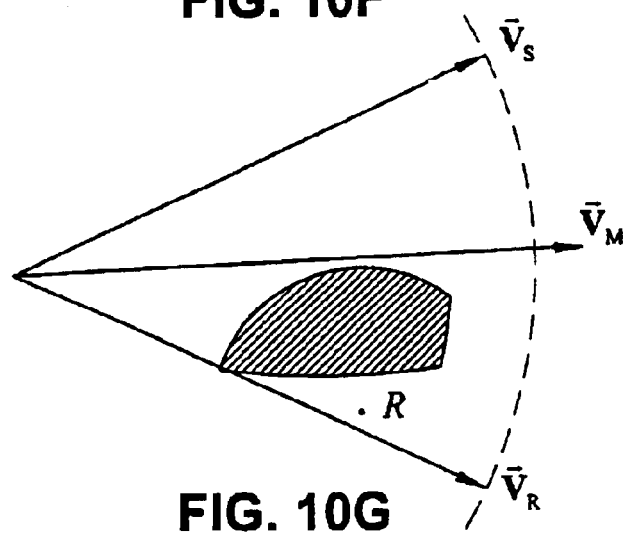

The above three circles are shown in FIG. 10F. The resulting permissible range for $\vec{I}_R$ is shown in FIG. 10G.

Figure 11A:
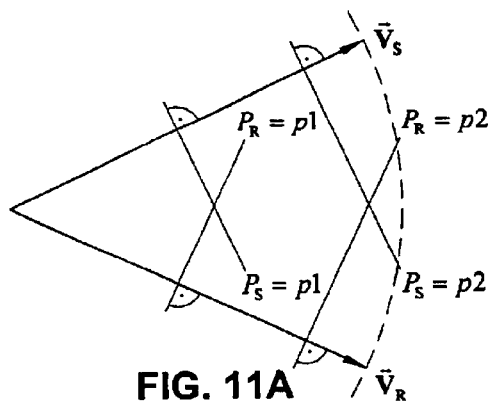
Figure 11B:
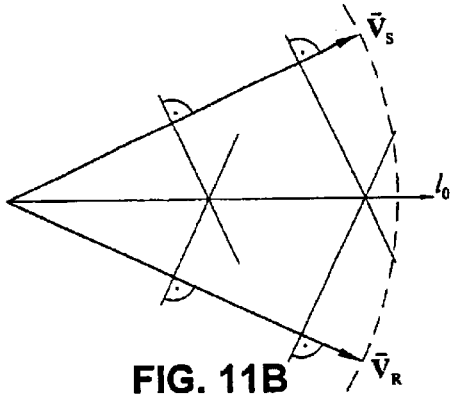
Figure 11C:
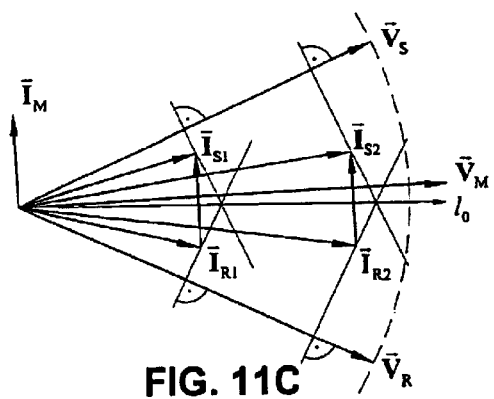
Figure 11D:
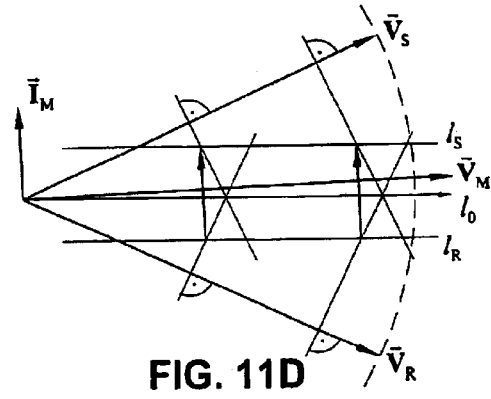

FIG. 11A shows $\vec{V}_S$, $\vec{V}_R$, and two pairs of equal power lines. Notice that the intersection points of equal power lines define an axes labelled $l_0$ in FIG. 11B. The $l_0$ coordinate of the point of intersection is proportional to the power transfer through the transmission line. Therefore, translating the pair of equal power lines along $l_0$ has the meaning of changing the transmitted power. FIG. 11C shows: $\vec{V}_S$, $\vec{V}_R$, axes $l_0$, two pairs of equal power lines, and the previously discussed $\vec{V}_M$. Recall the procedure demonstrated by FIG. 8C–8E that finds the unique steady state solutions for $\vec{I}_S$ and $\vec{I}_R$ based on the specified value of $\vec{V}_M$ and the specified power flow. Applying this procedure for varying power flow results in the range of solutions for $\vec{I}_S$ and $\vec{I}_R$ corresponding to the same $\vec{V}_M$. The solution pairs ($\vec{I}_{S1}, \vec{I}_{R1}$) and ($\vec{I}_{S2}, \vec{I}_{R2}$) corresponding to power transfers p1 and p2, respectively, are shown in FIG. 11C. It should be apparent that solution pairs ($\vec{I}_S, \vec{I}_R$) corresponding to the given $\vec{V}_M$ lie on the lines parallel to the axes $l_0$. Let $l_S$ designate the line defined by solutions for $\vec{I}_S$, and $l_R$ the line defined by the solutions of $\vec{I}_R$. Lines $l_S$ and $l_R$ are shown in FIG. 11D.

Figure 11E:
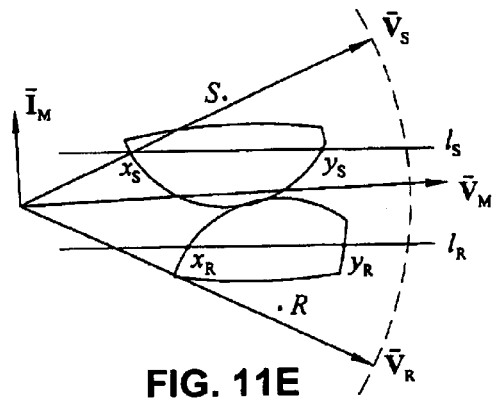
Figure 11F:
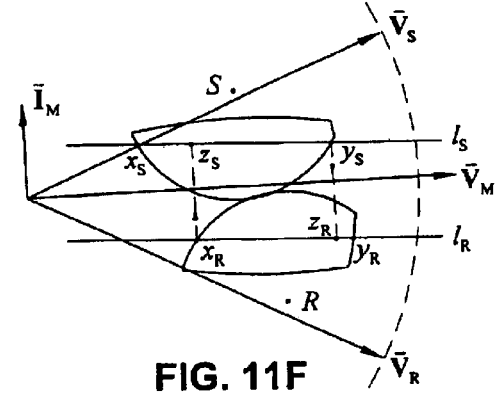

Previously discussed permissible regions for currents $\vec{I}_S$ and $\vec{I}_R$ are shown together with lines $l_S$ and $l_R$ in FIG. 11E. Points $x_S$ and $y_S$ denote the intersections of line $l_S$ with the region of permissible values for $\vec{I}_S$. Points $x_R$ and $y_R$ denote the analogous points on the line $l_R$. Solution pairs ($\vec{I}_S, \vec{I}_R$) are found so that $\vec{I}_S$ lies on the segment $\overline{x_S y_S}$, $\vec{I}_R$ lies on the segment $\overline{x_R y_R}$, and their difference equals $\vec{I}_M$. Hence, for the example shown in FIG. 11E, the tip of $\vec{I}_S$ lies on the segment $\overline{z_S y_S}$ where $z_S$ is the projection of $x_R$ onto $l_S$ in the direction of $\vec{I}_M$, while matching solutions $\vec{I}_R$ have their tip on the segment $\overline{x_R z_R}$, where $z_R$ is the projection of $y_S$ onto $l_R$ in the direction of $\vec{I}_M$. The solution pair ($\vec{I}_S, \vec{I}_R$) corresponding to ($y_S, z_R$) results in the maximum power flow achievable for this $\vec{V}_M$ under the conditions of the problem. Analogously, the solutions corresponding to ($z_S, x_R$) results in the minimum power flow under the same conditions.

Notice that each pair ($\vec{I}_S, \vec{I}_R$) from line segments $\overline{z_S y_S}$ and $\overline{x_R z_R}$ results in the unique solutions for a vector pair ($\vec{V}_X, \vec{V}_Y$), and consequently to the unique solutions for $P_S = P_1 = P_2 = P_R, Q_1,$ and $Q_2$.

Repeating this procedure for permissible values of $\vec{V}_M$ yields a range of all permissible steady state solutions for the given $\vec{V}_S$ and $\vec{V}_R$, and specified $B_M$ in the considered lossless system. Resulting solutions for $\vec{V}_X, \vec{V}_Y$, and active and reactive powers can now be tabulated. Next, the procedure can be repeated for all $B_M$ of interest, and the resulting multiplicity of tables can subsequently be processed to eliminate duplicates and keep only the solutions of interest. Various notions of optimization can be introduced in the processing of tables. Clearly, it is advantageous to choose solutions that use lower amplitudes of voltages $\vec{V}_X$ and $\vec{V}_Y$ to realize the same power flow. Such selection results in minimizing the ratings of the installed converters.

Finally, a set of tables can be created one for each pair of $\vec{V}_S$ and $\vec{V}_R$. The tables can either be prepared ahead of time and stored in memory associated with controller 46, or alternatively, partial tables can be computed to the desired accuracy in real time, to cover the range near the operating point of the power flow controller 14. Real time computations are feasible since the nature of the problem permits implementation of parallel processing. Furthermore, various optimization procedures dependent on the operating point and the applicable limits can be used to increase the speed of the computations. For values of $P_1, Q_1,$ and $Q_2$ separate $V_{Md}, V_{Mq},$ and $B_M$ are stored. Later, operator supplied values representative of $P_1, Q_1$ and $Q_2$ may be used by controller 46 to choose corresponding values of $V_{Md}, V_{Mq},$ and $B_M$ from a table associated with the actual values of $\vec{V}_S$ and $\vec{V}_R$.

As should be appreciated, the procedure explained above is not computationally optimal. It is presented in this way to permit the reader to easily understand the underlying concepts. Optimizations are possible and are largely regarded as a matter of practical implementation.

The tables obtained based on the above procedure can be used to plot various curves pertinent to the line 15 controlled by power flow controller 14. Perhaps the most interesting are the P-delta curves. Discussing these curves and effects of various limits provides a useful insight into how to coordinate the control of inverters 36 and 38 with the control of the shunt connected susceptance 22 to maximize or minimize the power flow.

Figure 12:
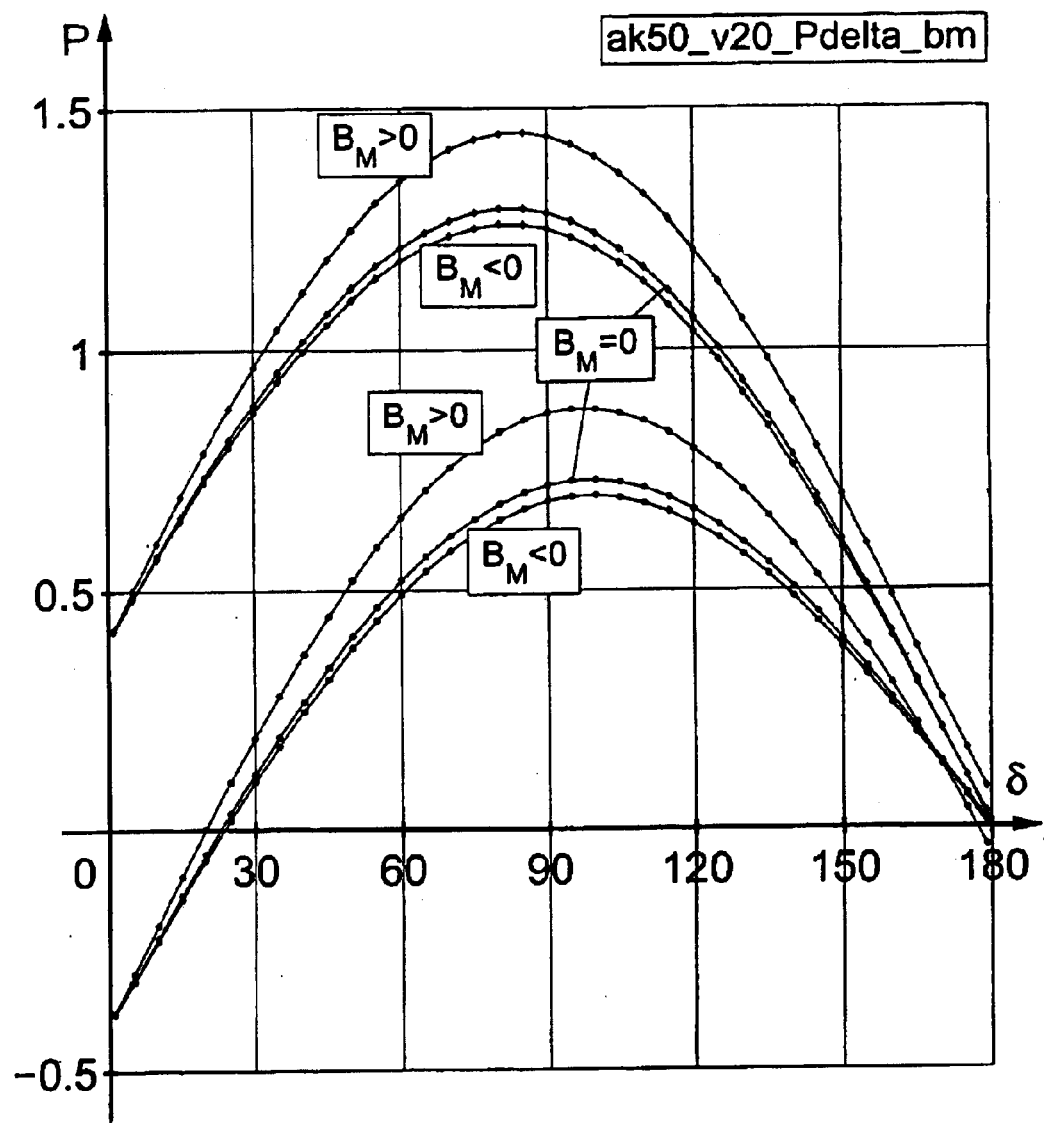
FIGS. 12 and 13 illustrate P-delta curves for the controller of FIG. 1.

An example set of normalized P-delta curves, corresponding to three discrete values of $b_M$, is shown in FIG. 12. A positive value, zero, and a negative value of $b_M$ were considered. The considered positive (capacitive) value of $B_M$ is four times larger in magnitude than the considered negative (inductive) value. A person of ordinary skill in the art will appreciate that such choice of values corresponds to a typical implementation of an SVC where one inductive bank is regulated to provide vernier control of supplied reactive power between the steps of multiple banks of capacitance. In FIG. 12 only the limits of injected converter voltage, i.e. limit conditions (6) and (7), were applied in the calculations use to produce the depicted curves. Two curves for each value of $B_M$ can easily be identified. The upper one corresponds to the maximized power flow, and the lower one to the minimized power flow. A person of ordinary skill in the art will readily appreciate that for any given value of a desired power flow can be arbitrarily chosen between the two extreme values specified by these curves, and achieved by appropriate control of the converters 36 and 38. Morevoer, it is apparent from FIG. 12 that ranges of power flow reachable for each value of $B_M$ overlap; therefore, at any given value of δ, power flow can be continuously varied between the lowest and highest curve while using only discrete values of shunt susceptance.

Figure 13:
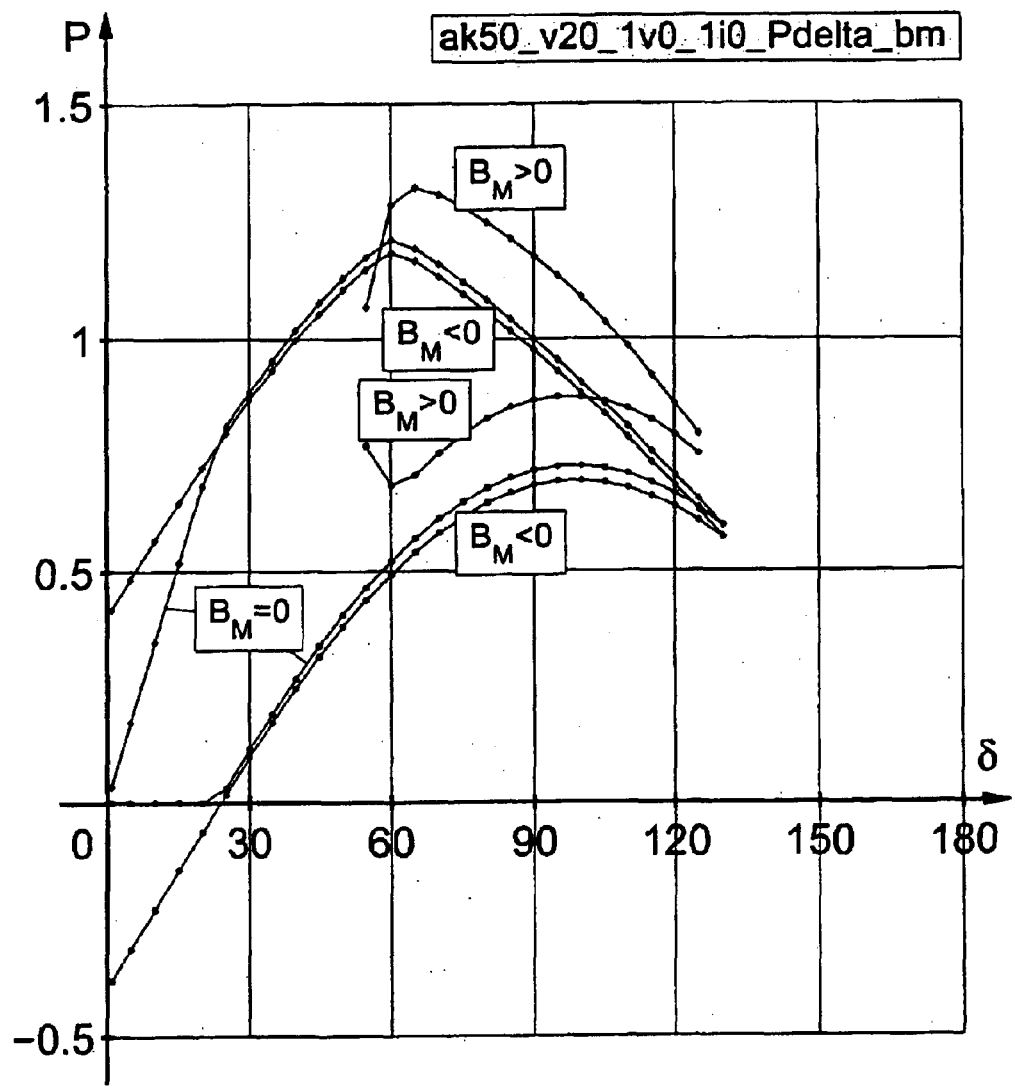

Another set of P-delta curves is shown in FIG. 13. Labelling of the curves is analogous to FIG. 12. In FIG. 13, in addition to limited magnitudes of converter voltages, magnitudes of terminal voltages, and magnitudes of line currents were limited to one per unit. Due to the application of additional limits possible ranges of solutions are visibly restricted. For example at large values of δ, none of the curves have valid solutions. This is due to the fact that even with full voltage capacity of converters applied to oppose the voltage across the line, current will still be above the limit value, and therefore no solution exists. Hence, for δ>125° the converters would have to be bypassed, to avoid damage due to over-current.

At lower values of δ a sharp decline in maximum power flow is visible on most curves. For example, the upper limit curve for $B_M>0$ declines sharply for δ<65°. This is due to the application of terminal voltage limits. Specifically, as the value of δ reduces while $B_M$ is held constant, the reactive power supplied in the middle of the line increases the magnitude of voltage $\vec{V}_M$. In order to maintain the terminal voltage levels within the limits, voltages injected by the converters must be used to oppose the increase of $|\vec{V}_M|$. Consequently, the amount of converter voltage remaining to be applied towards power flow control is lower and the maximum power flow drops.

An analogous phenomenon is observed on the lower limit curve for $B_M>0$. In this case the objective is to minimize the power flow; so, since a part of converter voltage capacity is lost on voltage control, minimum feasible power flow raises.

Finally, with shunt susceptance 22 equal to zero it is not possible to reverse the power flow at low values of δ without increasing the magnitudes of the voltages at equipment terminals above 1 p.u. Hence, the curve representing the minimized power flow for zero shunt susceptance 22 equals to zero at low values of δ.

The existence of "reachable set lookup tables" allows the operator of power flow controller 14 to choose the set-points for power flow controller 14 in such way to always maintain the operating point within the limits of the installed equipment. In the discussion of the real time controller hereinafter it will be assumed that the reference values for variables specified as inputs to the controller always belong in the reachable set.

Representative vector diagrams of the line controlled by the power flow controller 14 are shown in FIGS. 14A–14E. For consistency with previous figures, the same simplifications have been used.

Figure 14A:
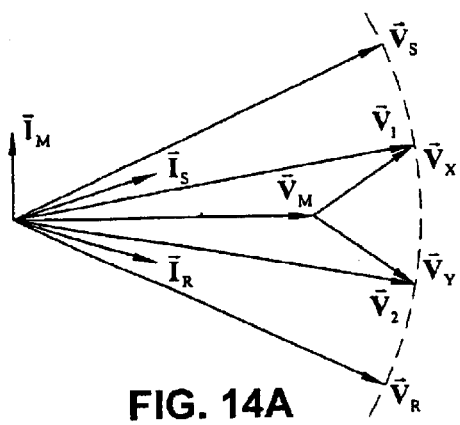
FIGS. 14A–14E illustrate vector diagrams of voltages and currents on the line controlled by the controller of FIG. 1.
Figure 14B:
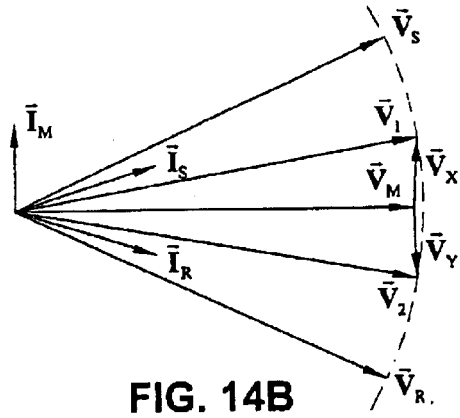

The vector diagram of FIG. 4 is repeated in FIG. 14A. The diagram in FIG. 14B is constructed using the same values for line currents, but different value for $B_M$. Resulting vector $\vec{V}_M$ is hence of larger magnitude and the corresponding $\vec{V}_X$ and $\vec{V}_Y$ are different. The comparison of the two diagrams provides another illustration that power flow controller 14 can be used for vernier control of the line currents using step-changed value of shunt susceptance 22.

Figure 14C:
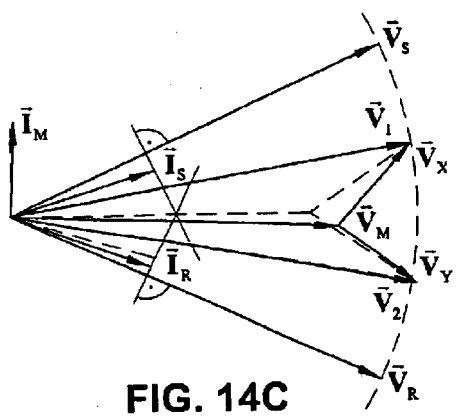

The vector diagram shown in FIG. 14C demonstrates the ability of power flow controller 14 to independently control the amount of reactive power supplied to the receiving line segment 18. The location of vectors corresponding to the operating point of FIG. 14A is shown in dashed lines to help quantify the difference.

Figure 14D:
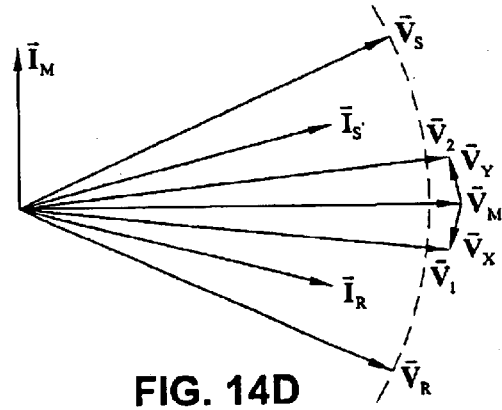

Vector diagram corresponding to increased power flow is shown in FIG. 14D. Increase in magnitudes of currents $\vec{I}_S$ and $\vec{I}_R$ is a result of increased relative angles between vectors $\vec{V}_S$ and $\vec{V}_1$, and vectors $\vec{V}_2$ and $\vec{V}_R$, respectively.

Figure 14E:
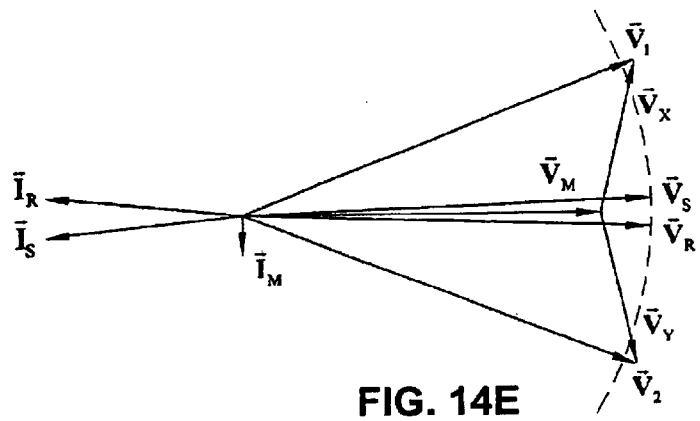

Finally, vector diagram illustrating the power flow reversal is shown in FIG. 14E. Relative position of vectors $\vec{I}_M$ and $\vec{V}_M$ indicates that $B_M<0$, i.e., that shunt susceptance is dominantly inductive.

Now, in order to control the operating states of power flow controller 14 to provide controlled power transfer between region 10 and 12, controller 46 (FIG. 1) controls voltage vectors $\vec{V}_X$ and $\vec{V}_Y$ as control variables for closed loop control of currents $\vec{I}_S$ and $\vec{I}_R$ while observing constraints and limit conditions, as detailed above.

A block diagram of an example programmable controller 46 suitable for dynamic control of the power flow controller 14 is illustrated with reference to FIGS. 15–25. The example controller 46 is presented to provide insight into the concepts required for successful controller design. As will be appreciated, many additions and modifications are possible. Moreover, it will be understood that the flow of signals and the distinction between blocks, are somewhat arbitrary, and may not be clearly delineated in a practical implementation. For example, a practical implementation of controller 46 may be formed using a computer based controller, programmed to receive control inputs and provide outputs equivalent to those of the depicted blocks, without actually calculating intermediate values described herein. Such a controller may maintain memory variables for storage of signal and parameter values, and subroutines to perform the functions assigned to the depicted blocks. The code for subroutines can be reused to implement the functionality of different blocks. As such, strictly speaking, it becomes unclear what a block is. On the other hand, it is apparent that a computer program based controller implementation permits easy access to any parameter that may be required to facilitate the computations. Therefore, example parameter values are used freely within the block diagrams to provide an explanation of how to make and use an example controller 46.

Figure 15:
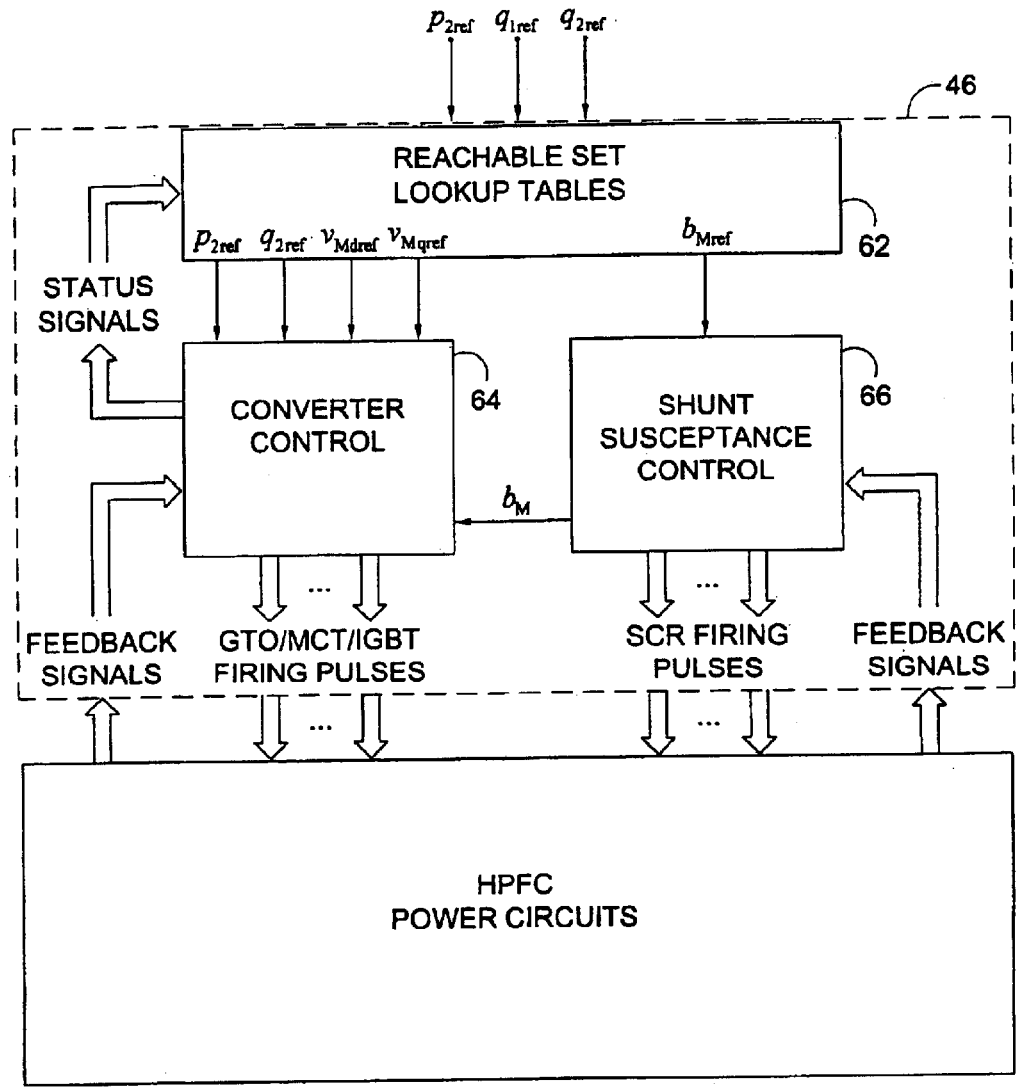
FIGS. 15–19E; 20A; 21A; 22–24; and 25B are simplified block diagrams of a programmable controller forming part of the power flow controller of FIG. 1.

High-level organization of the controller 46 and the conceptual signal flows are shown in FIG. 15. As illustrated, controller 46 includes a shunt susceptance control block 66, and a converter control block 64 in communication with memory storing look up tables of reachable control states, tabulated as described above. Susceptance control block 66 determines control outputs to be provided to susceptance 22 (FIG. 1), while converter control block 64 provides outputs to control operation of voltage-sourced converters 36 and 38. The reference values for $P_2$, $Q_1$ and $Q_2$ are supplied by the transmission system operator. Signals representative of these values appropriate for direct use within the controller 46 are denoted: $p_{2ref}$, $q_{1ref}$, and $q_{2ref}$. These signals are used for table lookup within the reachable set lookup tables block 62 to determine reference signals for the converter control block 64 and the shunt susceptance control block 66. As necessary, values stored within tables block 62 may be interpolated to provide values for $p_{2ref}$, $q_{1ref}$, and $q_{2ref}$ not explicitly stored within block 62.

As noted above, any given "line operating point" corresponds to infinitely many "internal operating points" (i.e. sets of $\vec{v}_X$, $\vec{v}_Y$, $b_M$, etc.). The role of the table lookup block 62 is to enable selection of a unique internal operating point that results in preferred optimal utilization of the installed equipment. The converter control block 64 provides the multiplicity of "status signals" to the table lookup block 62, to facilitate the choice of the relevant table.

The converter control block 64 is responsible for closed loop dynamic control of the voltage-sourced converters 36 and 38. Inputs to this block are: $p_{2ref}$, $q_{2ref}$, $v_{Mrefd}$, and $v_{Mrefq}$. As detailed with reference to FIGS. 8A–8F, a unique internal operating point can be found based on the desired power transfer $P_2$ (approximately equal to $P_R$ or $P_S$) and the specified value for $\vec{V}_M$. Therefore, specifying $q_{2ref}$ is, strictly speaking, unnecessary. However, providing the value for $q_{2ref}$ from lookup tables permits simpler internal organization of converter control block 64.

The converter control block 64 outputs signals for control of switching elements in the voltage-sourced converters 36 and 38; in the depicted embodiment these signals are denoted as "GTO/MCT/IGBT firing pulses". Appropriately isolated and buffered signals suitable for direct application to the control terminals of the power electronics switches of voltage-sourced converters 36 and 38 are commonly referred to as "firing pulses". Firing pulses directly control the state of the switches in the VSCs, hence they provide means for direct control of voltages $\vec{V}_X$ and $\vec{V}_Y$.

At present, electronics switches available at the appropriate power level are: Gate Turn-Off Thyristor (GTO), MOS Controlled Thyristor (MCT), and Insulated Gate Bipolar Transistor (IGBT). Particular choice of converter switching components and the overall number of switches will be driven by the economies of manufacture; hence, the properties of the firing pulses, their number, waveforms, and timing, are largely implementation dependent and will not be further discussed.

Shunt susceptance control block 66 takes a reference signal $b_{Mref}$ and generates the appropriate control signals for the shunt susceptance 22. Feedback signals representative of $\vec{V}_M$ and $\vec{I}_M$ are used to facilitate the correct timing of the control pulses and to compute the actual value of shunt susceptance $b_M$. Depending on the implementation of the shunt susceptance 22, the actual susceptance change will occur with a certain delay relative to the reference value supplied by the table lookup block. Accurate value of $b_M$ is used by block 64; therefore, the signal of $b_M$ is supplied directly from the block 66 to the block 64.

The signals at the output of shunt susceptance control block 66 are denoted as "SCR firing pulses" as silicon controlled rectifiers (SCRs) are used in the disclosed embodiment for the switching of variable capacitor bank 28 and control of inductor bank 32. Clearly, if alternative switching and control means are used in the power circuit of variable shunt susceptance 22, appropriate control signals will be generated.

Shunt susceptance control is today regarded as a mature subject. A thorough review of typical SVC construction and it's controller implementation can be found in "Understanding FACTS: Concepts and Technology of Flexible AC Transmission Systems", supra. Therefore, the block 66 will not be further discussed here.

Figure 16:
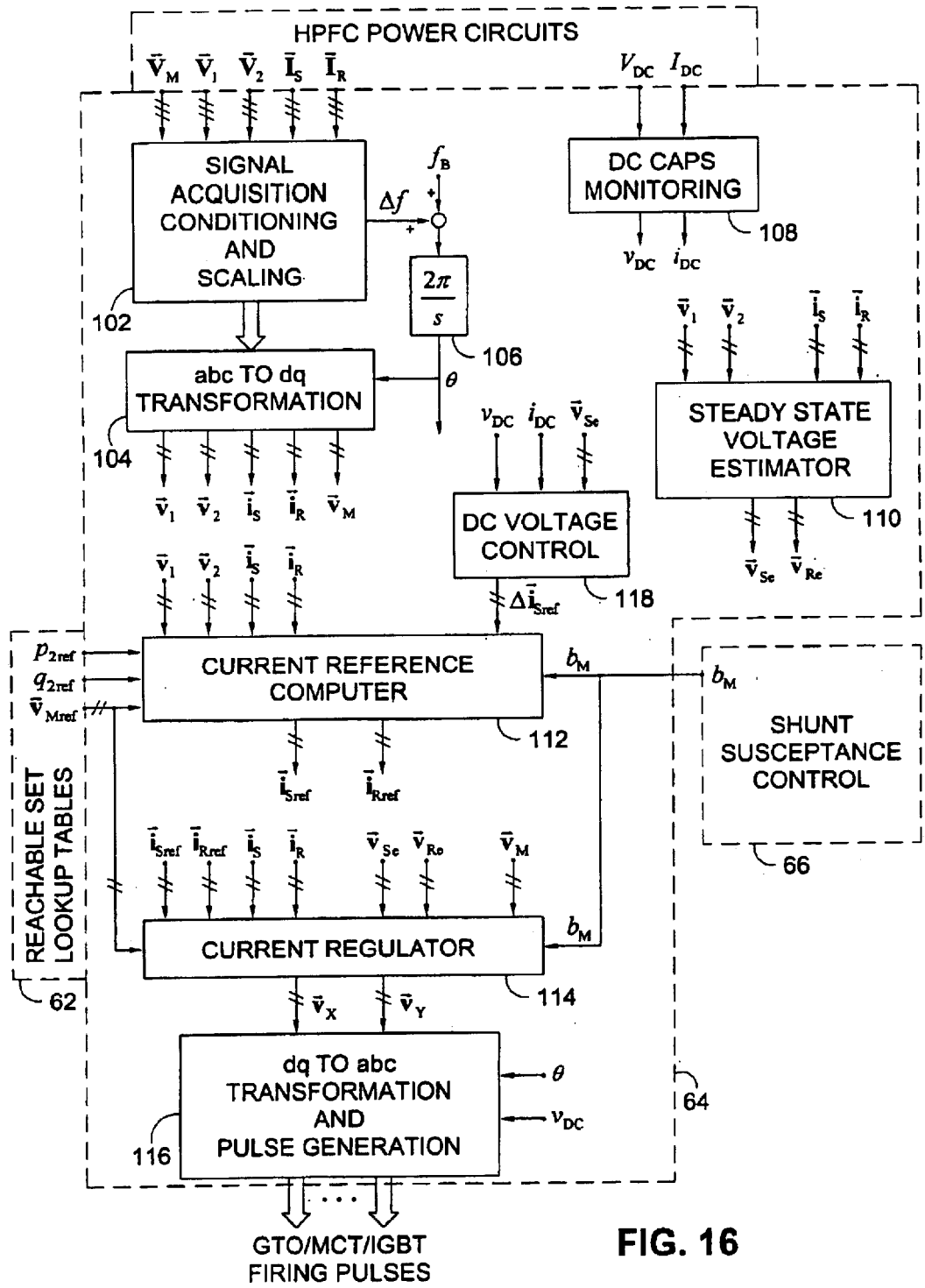

A block diagram of an example converter control block 64 is shown in FIG. 16. Interconnections of the blocks are indicated by using signal labels. Labels in lower case letters are used to indicate scaled signals within the controller. Note that some signal labels represent vector quantities, i.e., ordered pairs or triplets of values. The number of short lines crossing the signal path indicates the "internal order" of each signal. Signal paths with no "crossing lines" represent scalar values.

Signal acquisition, conditioning and scaling is done in the block 102. Actual measurement technique will vary with implementation. The bandwidth of sensors should be sufficiently higher than the bandwidth of the voltage-sourced converters (actuators in this system). As the bandwidth of high-power voltage-sourced converters is a mere several hundred Hertz most commonly available sensors will be appropriate. Preferably the transfer functions of sensors measuring currents match those of the sensors measuring voltages. This should equalize delays in signals that are later used in the controller.

Scaled and conditioned signals of all incoming values are passed to the block 104 where they are transformed into the rotating reference frame. The transformation is done in accordance with equations (1) and (2). The value for $\theta$ required for the transformation is the input to this block; it is shown at the right hand side.

Block 106 generates the signal $\theta$. This block is an integrator that takes the signal of system frequency as its input. The signal of system frequency is derived as a sum of the base value of frequency "$f_B$", and the correction "$\Delta f$" generated by 102. Advantageously, since none of the following control laws depend on exact synchronization of rotating reference frame to any of the vectors in the system, the speed of generating the accurate $\Delta f$ signal is not critical.

Block 108 monitors DC capacitors 44. Depending on the size and practical construction of the voltage-sourced converters 36 and 38, DC capacitors 44 will likely be built as multiple banks of capacitors, operated under the same conditions. The signal of total current can in such case be derived based on measurements of current in one capacitor bank and then scaled accordingly to represent the whole set. Dynamics of capacitor charging are dependent on the installed amount of capacitance. These dynamics are expected to be slower than the dynamics of line currents control, therefore the bandwidth of sensing circuits can be accordingly slower than that of the sensing circuits for line currents and voltages.

Steady state voltage estimates of equivalent sending and receiving end voltages are computed in the block 110. Inputs to this block are the signals representing values of the terminal voltages and signals representing the currents flowing through the corresponding line segments. It was explained earlier that the estimates of sending and receiving end voltage are used to reduce the bias on integral elements of the PI gains in the current regulators. The accuracy of the estimates is therefore not critical, as the integrators will suppress the remaining error. Consequently, the design of this block is believed to be within the grasp of practicing engineers and will not be given further attention here.

Block 118 is responsible for the DC capacitor voltage control. A correction for sending end current reference $\Delta \vec{i}_{Sref}$ is computed based on $v_{DC}$, $i_{DC}$, and $\vec{v}_{Se}$. Internal structure of this block will be reviewed in detail.

Reference values of currents are computed in the block 112. Internal structure of this block will be reviewed in detail. It shall be noticed that this block receives the signals of reference values $p_{2ref}$, $q_{2ref}$, and $\vec{v}_{Mref}$ supplied from control block 62, and the value of $b_M$ supplied by susceptance control block 66. Based on these values and values of signals of locally measured and estimated variables, current references are computed and passed to the current regulator.

A current regulator 114 performs closed loop current control. It generates the signals $\vec{v}_X$ and $\vec{v}_Y$, proportional to the required voltages $\vec{V}_X$ and $\vec{V}_Y$ to provide the required current, as detailed below.

Signals $\vec{v}_X$ and $\vec{v}_Y$ representing the required voltage vectors are first transformed into the stationary frame of reference, and based on the obtained values the appropriate firing pulses are generated inside the block 116. Value of θ is required to perform the transformation, while the value of $V_{DC}$ is needed to eliminate the effects of the DC voltage variations on the converter output voltages. Internal design of this block is implementation dependent and will not be further discussed.

To summarize, the dynamical control of the power flow controller 14 is preferably realized in the current space. As such, the reference values at the controller level, that is $p_{2ref}$, $q_{2ref}$, and $\vec{v}_{Mref}$, are first transformed into the reference values for currents in the sending and receiving line segments, that is $\vec{i}_{Sref}$ and $\vec{i}_{Rref}$. The closed loop current controllers are then employed to force the system currents to become equal to their respective reference values. Other objectives, such as keeping the DC capacitors charged are achieved by appropriately modifying the reference values for currents. It will become apparent through the discussion of the current regulator that active damping of voltage $\vec{V}_M$ may be required under some conditions. This too is achieved by modifying the current references.

The following discussion of the controller blocks is based on the assumption that the dynamics of DC capacitors charging and discharging are considerably slower than the dynamics of currents and voltages in the AC circuit. Therefore, it is possible to assume that the voltage on DC capacitors varies slowly during the AC circuit transients and that its variation can be suppressed by appropriate switching modulation in the block 116. The regulator structure for DC capacitors voltage control will be reviewed separately. This assumption enables a structured overall controller design.

It is helpful to start this discussion by identifying the state variables of example power flow controller 14 and reviewing their interdependences. As should be appreciated, the number of state variables of power flow controller 14 depends on the value of $B_M$.

For $B_M > 0$, i.e., for variable susceptance 22 having dominantly capacitive susceptance, there are seven state variables. They are: $I_{Sd}$, $I_{Sq}$, $I_{Rd}$, $I_{Rq}$, $V_{Md}$, and $V_{Mq}$ in the AC circuit, and $V_{DC}$ in the DC circuit. Voltage vectors $\vec{V}_X$ and $\vec{V}_Y$ are independently adjustable, and the value for $B_M$ can be arbitrarily selected, hence there are five control variables in the system: $V_{Xd}$, $V_{Xq}$, $V_{Yd}$, $V_{Yq}$, and $B_M$.

For $B_M < 0$, i.e. for variable susceptance 22 having dominantly inductive susceptance, voltages $V_{Md}$ and $V_{Mq}$ are the linear combinations of other system voltages, hence the order of the system reduces to five. The number of control variables remains unchanged.

For $B_M = 0$, current vectors $\vec{I}_S$ and $\vec{I}_R$ are identical, i.e. $\vec{I}_S \equiv \vec{I}_R$. Hence the order of the system reduces to three; state variables are: $I_{Sd}$, $I_{Sq}$, and $V_{DC}$. The number of control variables in this case reduces to four as $B_M = 0$.

This is summarized in Table 1.

TABLE 1

State and control variables for various values of $B_M$

| | $B_M > 0$ | $B_M = 0$ | $B_M < 0$ |
|---|---|---|---|
| Order of the system | 7 | 3 | 5 |
| State variables | $I_{Sd}$, $I_{Sq}$, $I_{Rd}$, $I_{Rq}$, $V_{Md}$, $V_{Mq}$, $V_{DC}$ | $I_{Sd} = I_{Rd}$, $I_{Sq} = I_{Rq}$, $V_{DC}$ | $I_{Sd}$, $I_{Sq}$, $I_{Rd}$, $I_{Rq}$, $V_{DC}$ |
| Number of control variables | 5 | 4 | 5 |
| Control variables | $V_{Xd}$, $V_{Xq}$, $V_{Yd}$, $V_{Yq}$, $B_M$ | $V_{Xd}$, $V_{Xq}$, $V_{Yd}$, $V_{Yq}$ | $V_{Xd}$, $V_{Xq}$, $V_{Yd}$, $V_{Yq}$, $B_M$ |

In each case voltage vectors $\vec{V}_S$ and $\vec{V}_R$ can be regarded as slowly varying disturbances, and their values can be estimated based on locally measured variables. Additionally, and according to the prior assumption, the dynamics of DC capacitors are considerably slower than the dynamics of AC circuit; hence, $V_{DC}$ may be regarded as constant.

Furthermore, it is practical to keep the value of $B_M$ constant during AC circuit transients. The value of $B_M$ can either be varied slowly, or changed instantly and then left constant in the following time interval. In the latter case the change of $B_M$ disturbs the steady state of system currents and voltages, and the ensuing transient is damped by the appropriate action of voltage vectors $\vec{V}_X$ and $\vec{V}_Y$. With this assumption the number of control variables becomes four in each case.

Figure 17:
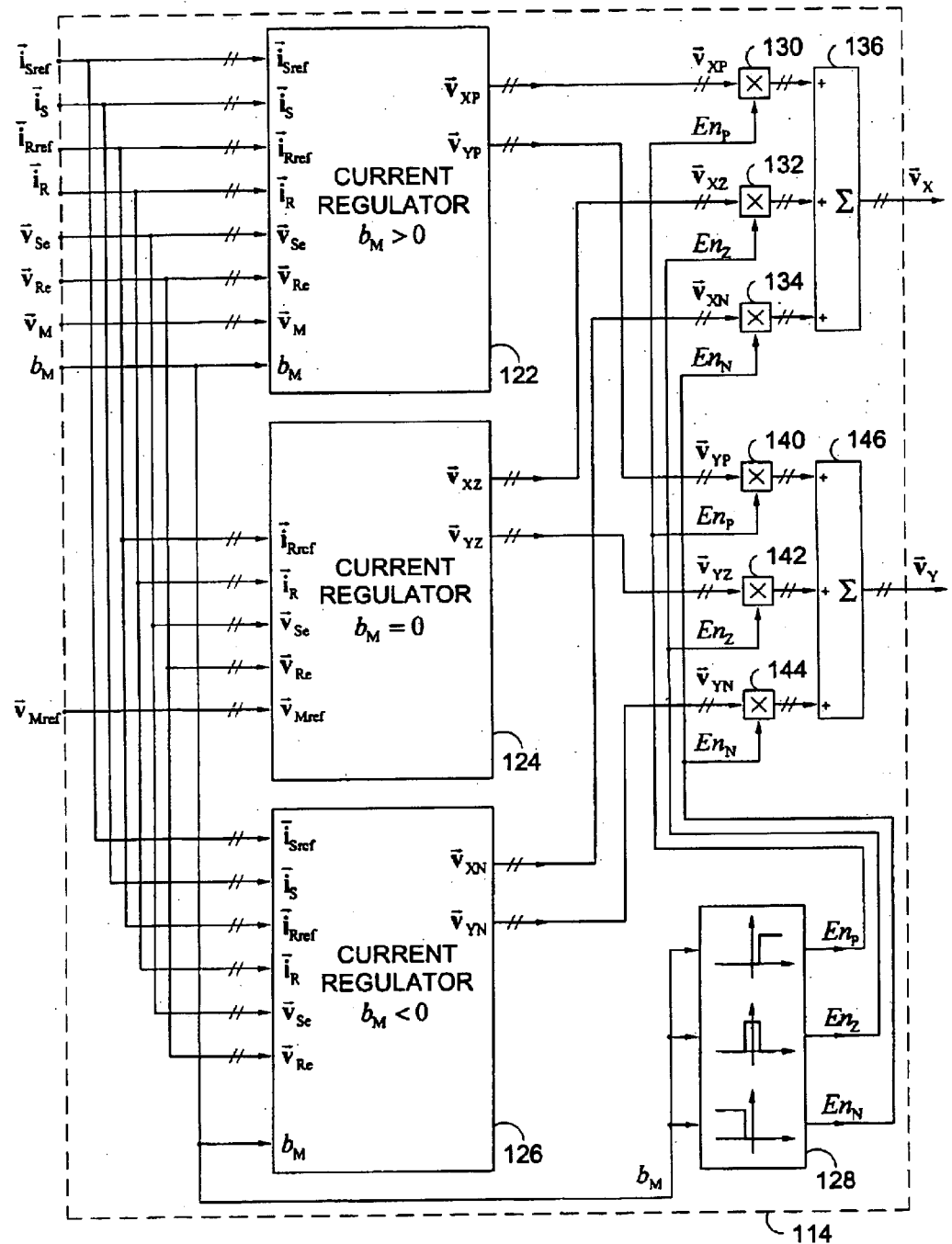

Now, current regulator 114 of control block 64 may be analyzed as three independent current regulators 122, 124, and 126, depending on the value of $B_M$, as shown in FIG. 17. Output signals from each of the regulators 122, 124, and 126 are scalar multiplied by the corresponding enable signal. For example, output signal $\vec{v}_{XP}$ representing the desired value for voltage $\vec{V}_X$ when $b_M > 0$, is scalar multiplied by the signal $En_P$ in the block 130. The role of the block 128 is to generate appropriate enable signals based on the actual value of $b_M$. Hence, output signals $\vec{v}_X$ and $\vec{v}_Y$ representing the desired values for $\vec{V}_X$ and $\vec{V}_Y$ can be generated as simple vector sums of the corresponding regulator outputs. The sum functions are realized by the blocks 136 and 146 for signals $\vec{v}_Y$ and $\vec{v}_X$, respectively.

Figure 18:
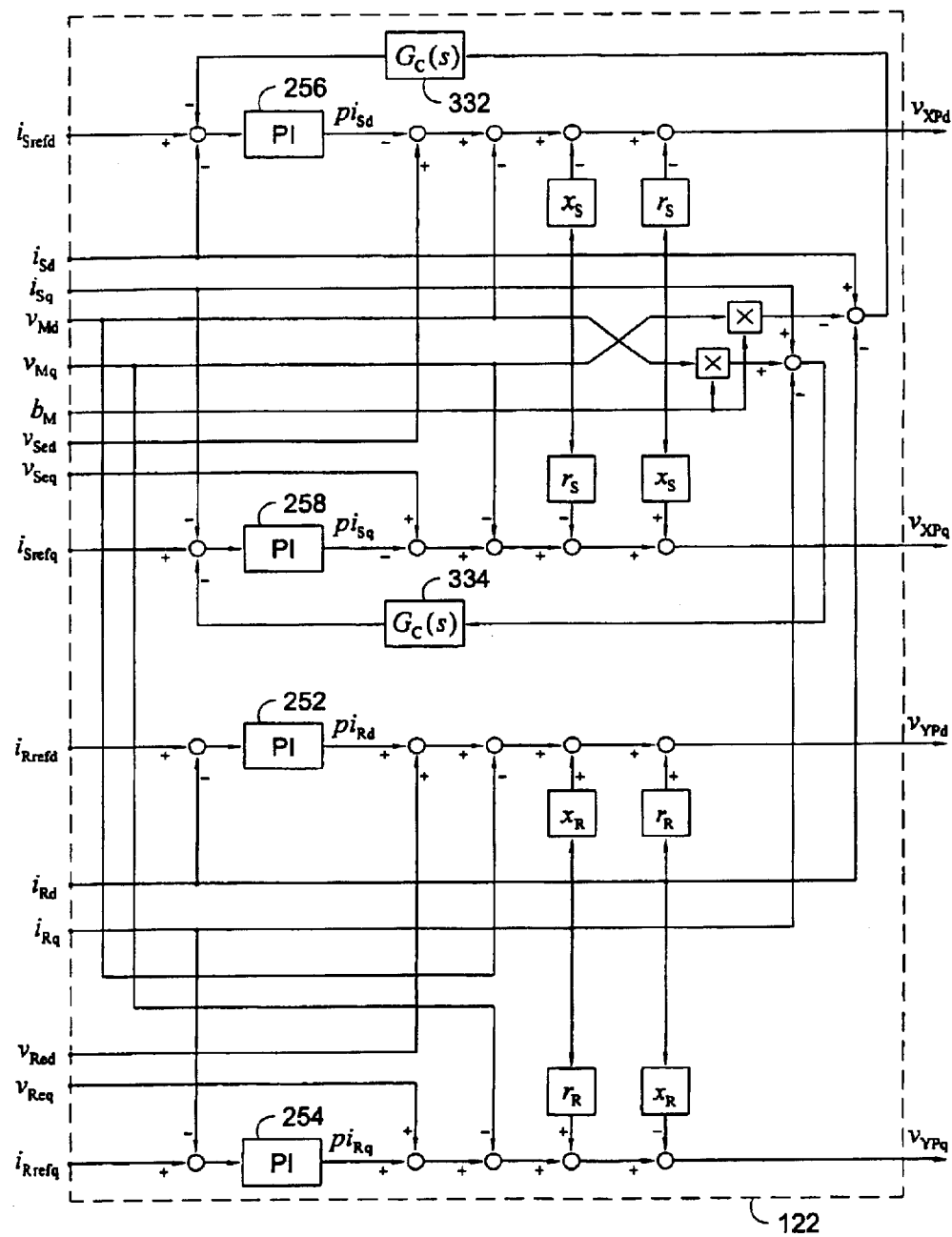

Current regulator 122 (i.e. current regulator 114 for $b_M > 0$) may be reviewed first. Its complete block diagram is shown in FIG. 18, and explained with reference to FIGS. 19A–19E, 20A–20B and 21A–21B. Differential equations describing the system shown in FIG. 2 can be divided into three groups. First, the differential equations describing the dynamics of line segment 18, are:

$$L_R \frac{dI_{Rd}}{dt} + \omega L_R I_{Rq} + R_R I_{Rd} = V_{Md} + V_{Yd} - V_{Rd} \quad (38)$$

$$L_R \frac{dI_{Rq}}{dt} - \omega L_R I_{Rd} + R_R I_{Rq} = V_{Mq} + V_{Yq} - V_{Rq}$$

Second, the differential equations describing the dynamics of line segment 16, are:

$$L_S \frac{dI_{Sd}}{dt} + \omega L_S I_{Sq} + R_S I_{Sd} = V_{Sd} - V_{Xd} - V_{Md} \quad (39)$$

$$L_S \frac{dI_{Sq}}{dt} - \omega L_S I_{Sd} + R_R I_{Sq} = V_{Sq} - V_{Xq} - V_{Mq}$$

And third, the differential equations describing the dynamics of positive shunt connected variable susceptance 22, that is, the dynamics of shunt connected AC capacitors, are:

$$\frac{B_M}{\omega} \frac{dV_{Md}}{dt} + B_M V_{Mq} = I_{Md} = I_{Sd} - I_{Rd} \quad (40)$$

$$\frac{B_M}{\omega} \frac{dV_{Mq}}{dt} - B_M V_{Md} = I_{Mq} = I_{Sq} - I_{Rq}$$

The three groups of equations (38), (39) and (40) describe a complex dynamical system. State variables within each group are cross-coupled, and there also exist cross-coupling between the groups. Notice that $V_{Md}$ and $V_{Mq}$ appear on the right hand side of the equations (38) and (39) while the d-q components of line currents appear on the right hand side of equations (40). Additional complexity arises from the fact that there are only four control variables in the system with six states.

A regulator suitable for closed loop control of $I_{Rd}$ and $I_{Rq}$ can be obtained by using voltage components $V_{Yd}$ and $V_{Yq}$ to achieve certain closed loop dynamics. Let (38) be rewritten into a more common form:

$$L_R \frac{dI_{Rd}}{dt} = -R_R I_{Rd} - \omega L_R I_{Rq} + V_{Md} + V_{Yd} - V_{Rd} \quad (41)$$

$$L_R \frac{dI_{Rd}}{dt} = \omega L_R I_{Rd} - R_R I_{Rq} + V_{Mq} + V_{Yq} - V_{Rq}$$

Figure 19A:
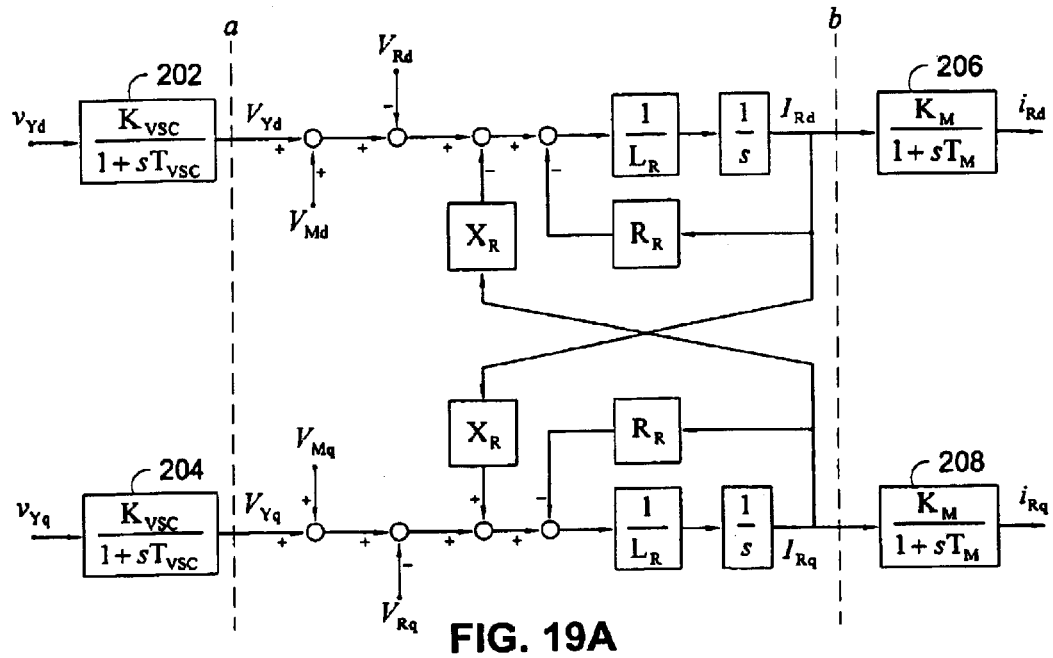

The block diagram of this dynamical system is shown between the dashed lines "a" and "b" in FIG. 19A. To the left of line "a" are the blocks 202 and 204, representing the approximation for the dynamics of the voltage-sourced converter 38. Specifically, voltage-sourced converter 38 acts as an amplifier that takes the signals $V_{Yd}$ and $V_{Yq}$, performs the transformation of these signals into "abc" frame of reference, and outputs the voltages $V_{Ya}$, $V_{Yb}$, and $V_{Yc}$ that correspond to the voltages $V_{Yd}$ and $V_{Yq}$ in "d-q" space. All this is bundled into just two blocks in order to simplify the block diagram. The factor $K_{VSC}$ represents the total gain from the signal to the output-voltage, while the first order lag characterized by the time constant $T_{VSC}$ models the delays inherent to the above processing. Similarly, the blocks 206 and 208, located at the right hand side of the line "b", represent the approximate transfer function of the current measurement system. At the outputs of these blocks are the current feedback signals: $i_{Rd}$ and $i_{Rq}$, respectively.

Figure 19B:
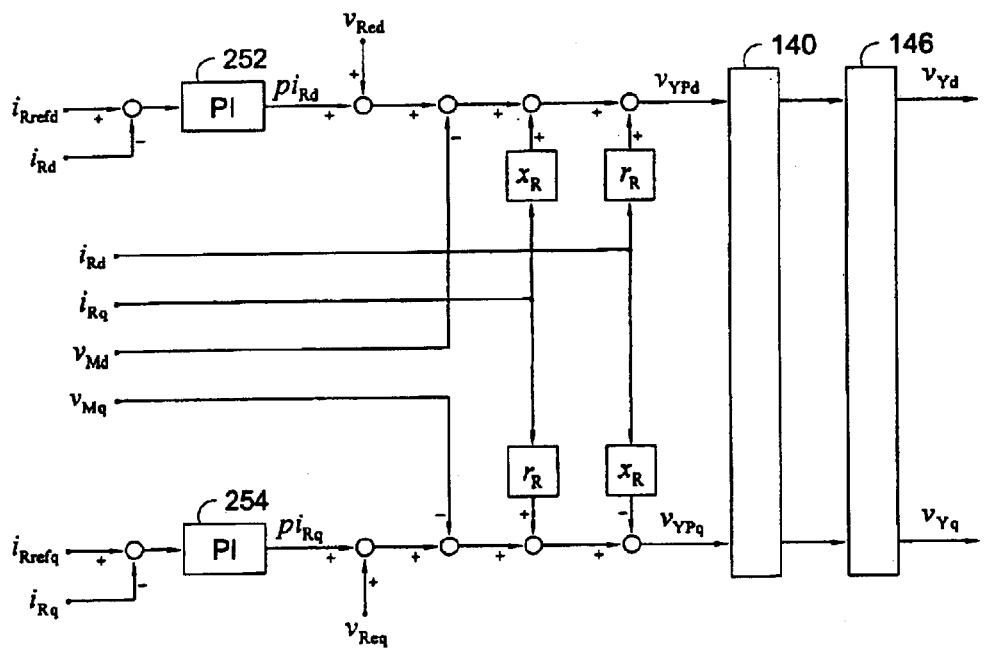

Suppose that the value of $\vec{v}_Y$ is formed as shown in FIG. 19B. The motivation for such composition is to cancel the unwanted terms on the right hand side of equations (41) and introduce new terms that will result in the desired dynamics. The resulting system is shown in FIG. 19C. It is apparent that the dynamics in d and q axes are now decoupled and hence they can be dealt with independently. Signals $ERR_{Rd}$ and $ERR_{Rq}$ represent the respective errors due to imperfect cancellation of terms, and they can be regarded as disturbances to this system. The integral gains embedded in the blocks 252 and 254 are located before the point of disturbance insertion; hence, zero steady state error in current control will be achieved in each loop. By suitable selection of PI gains the speed and damping of closed loop dynamics of current components $I_{Rd}$ and $I_{Rq}$ can be adjusted to the desired values. If appropriate combinations of parameters are used, the closed loop transfer functions from the components of $\vec{i}_{Rref}$ to the components of $\vec{i}_R$ can be approximated by the first order lag blocks, as shown symbolically in FIG. 19D.

An analogous rationale can be used to compose a regulator for closed loop control of $\vec{I}_S$. Appropriate choice of PI gains (blocks 256 and 258 in FIG. 18) in this system can warrant equivalent dynamics of this regulator and the regulator for $\vec{I}_R$, irrespective of the actual line segment lengths. Notice that matching time constants of these controllers is not mandatory, only practical. Resulting simplified transfer functions from the components of $\vec{i}_{Sref}$ to the components of $\vec{i}_S$ are shown in FIG. 19E.

Figure 20A:
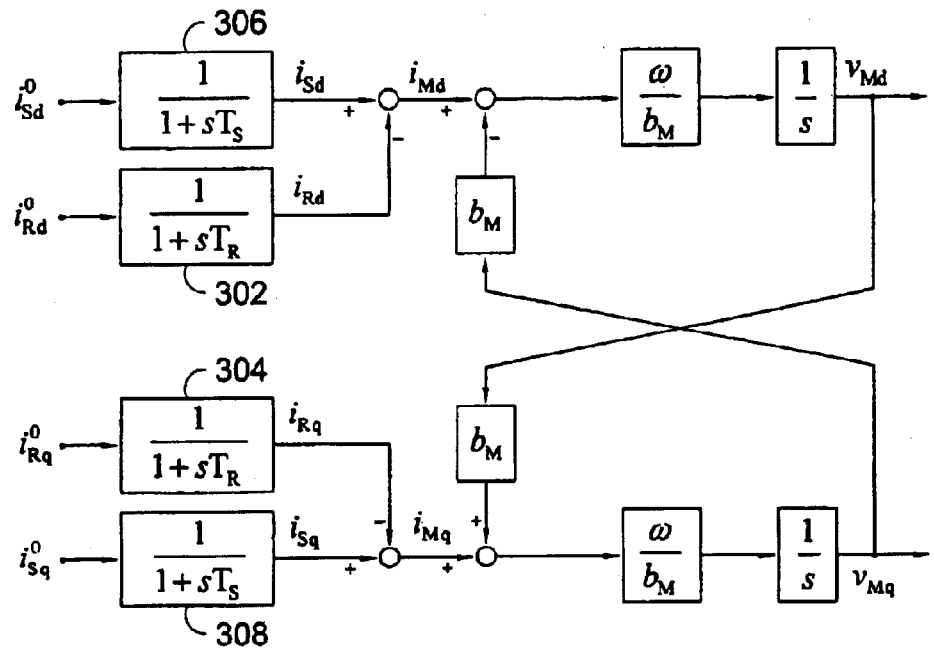
FIG. 20B is a phase portrait of voltage across capacitive shunt susceptance before active damping is applied.

It is apparent from the above discussion that the composition of signals $\vec{v}_X$ and $\vec{v}_Y$ is based on the instantaneous value of $\vec{V}_M$. Therefore, as long as the desired values of $\vec{V}_Y$ and $\vec{V}_X$ are "within reach" of the converters, the dynamics of $\vec{V}_M$ do not affect the dynamics of $\vec{I}_S$ and $\vec{I}_R$. The converse—that the dynamics of $\vec{I}_S$ and $\vec{I}_R$ do not affect the dynamics of $\vec{V}_M$—is not true. A block diagram representing the dynamics of $\vec{v}_M$ according to equations (40) and closed loop dynamics of $\vec{i}_R$ and $\vec{i}_S$ according to FIG. 19D and FIG. 19E, respectively, is shown in FIG. 20A. For sake of simplicity this block diagram is drawn using the signal representatives of physical variables. With reference values $\vec{i}_S^0$ and $\vec{i}_R^0$ brought to the inputs of current regulators, the expected steady state value of $\vec{v}_M$ is given by:

$$\vec{v}_M^0 = \begin{bmatrix} 0 & \frac{-1}{b_M} \\ \frac{1}{b_M} & 0 \end{bmatrix} (\vec{i}_S^0 - \vec{i}_R^0) \quad (42)$$

Figure 20B:
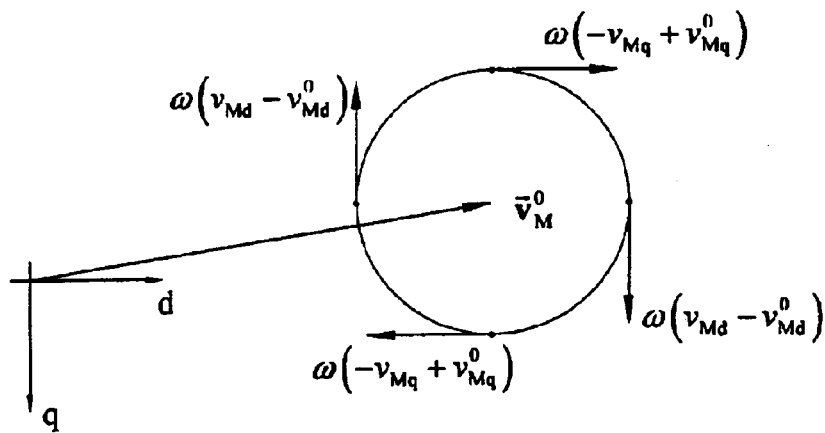

On the other hand, examination of the block diagram shows that there is no damping in the dynamics of $\vec{v}_M$; hence, undesirable oscillations of this voltage will occur with every change of the operating point. This is illustrated in FIG. 20B. A circle centered in $\vec{v}_M^0$ is a trajectory of $\vec{v}_M$ after an initial condition type disturbance. The tangent vectors shown in the FIG. represent the derivatives of $V_{Md}$ and $V_{Mq}$ according to the block diagram, or equations (40).

Figure 21A:
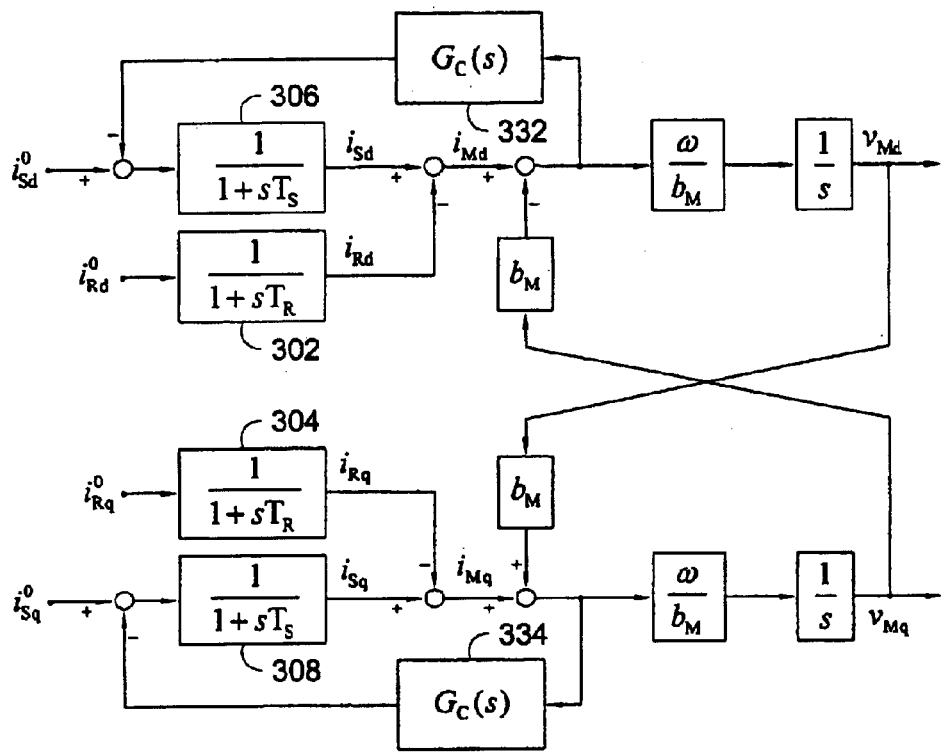
FIG. 21B is a phase portrait of voltage across capacitive shunt susceptance after application of active damping.
Figure 21B:
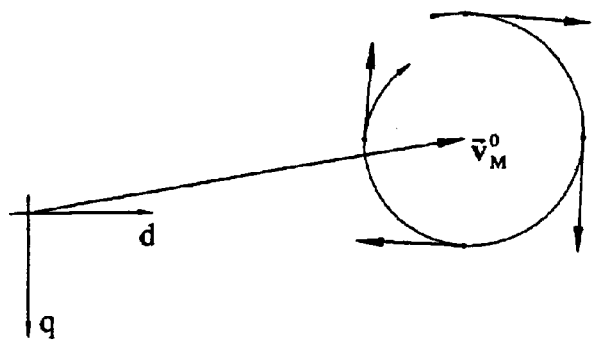

Introducing damping into this system is equivalent to adding an additional component to the above tangent vectors that are pointed towards $\vec{v}_M^0$. A simple way to achieve this is to subtract the phase delayed value of the tangent vector from $\vec{i}_{Sref}$. The proposed compensation is shown in FIG. 21A. The choice of the phase lag and the gain of the transfer function $G_C(s)$ implemented in the blocks 332 and 334 is coordinated with the phase lag already existing in the elements 306 and 308, in order to achieve the appropriate overall phase shift. The resulting change in $\vec{v}_M$ dynamics is illustrated in FIG. 21B.

The current regulator 126 (i.e. current regulator 114 for $b_M<0$) is reviewed next. Let $L_M$ be defined as $$L_M = \frac{-1}{\omega B_M} \tag{43}$$

The differential equations describing the system are:

$$(L_S + L_M)\frac{dI_{Sd}}{dt} - L_M \frac{dI_{Rd}}{dt} = \tag{44}$$
$$-R_S I_{Sd} - \omega(L_S + L_M)I_{Sq} + \omega L_M I_{Rq} + V_{Sd} - V_{Xd}$$

$$(L_S + L_M)\frac{dI_{Sq}}{dt} - L_M \frac{dI_{Rq}}{dt} =$$
$$\omega(L_S + L_M)I_{Sd} - R_S I_{Sq} - \omega L_M I_{Rd} + V_{Sq} - V_{Xq}$$

$$-L_M \frac{dI_{Sd}}{dt} + (L_R + L_M)\frac{dI_{Rd}}{dt} =$$
$$\omega L_M I_{Sq} - R_R I_{Rd} - \omega(L_M + L_R)I_{Rq} + V_{Yd} - V_{Rd}$$

$$-L_M \frac{dI_{Sq}}{dt} + (L_R + L_M)\frac{dI_{Rq}}{dt} =$$
$$-\omega L_M I_{Sd} + \omega(L_M + L_R)I_{Rd} - R_R I_{Rq} + V_{Yq} - V_{Rq}$$

Figure 22:
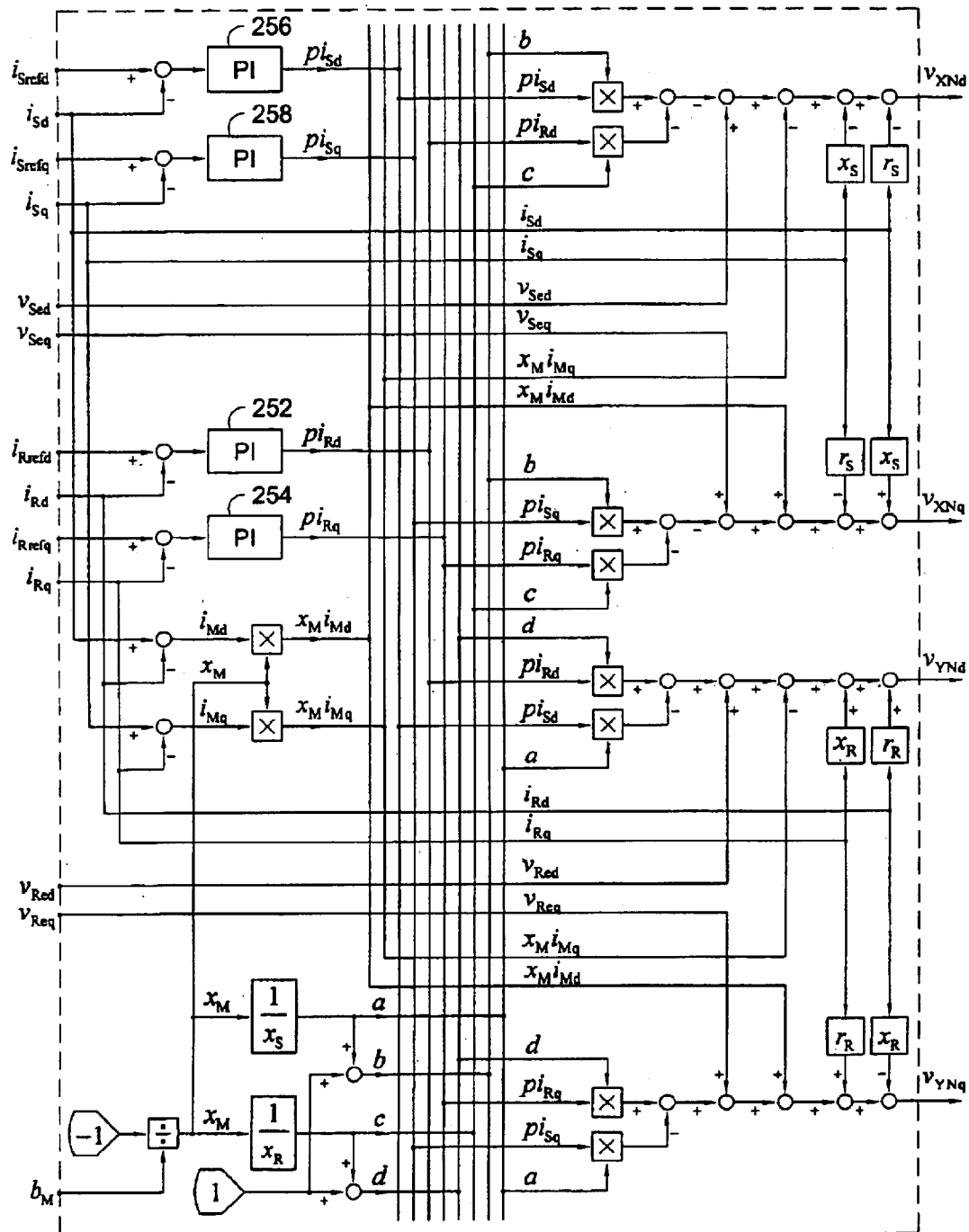

It is apparent that $\vec{V}_M$ is no longer a state variable and that consequently additional coupling exists between the current terms. Nonetheless, the presence of a control variable on the right hand side of each of the equations permits direct control of all current components. The block diagram of the controller suitable for closed loop current control is shown in FIG. 22. Constants a,b,c,d are used to resolve the coupling between the state variables. This permits straightforward selection of the PI gains in the blocks 252, 254, 256, and 258. In fact, these blocks are the same blocks used in the block 122. This illustrates by way of example the earlier statement how subroutines can be shared between different blocks.

Figure 23:
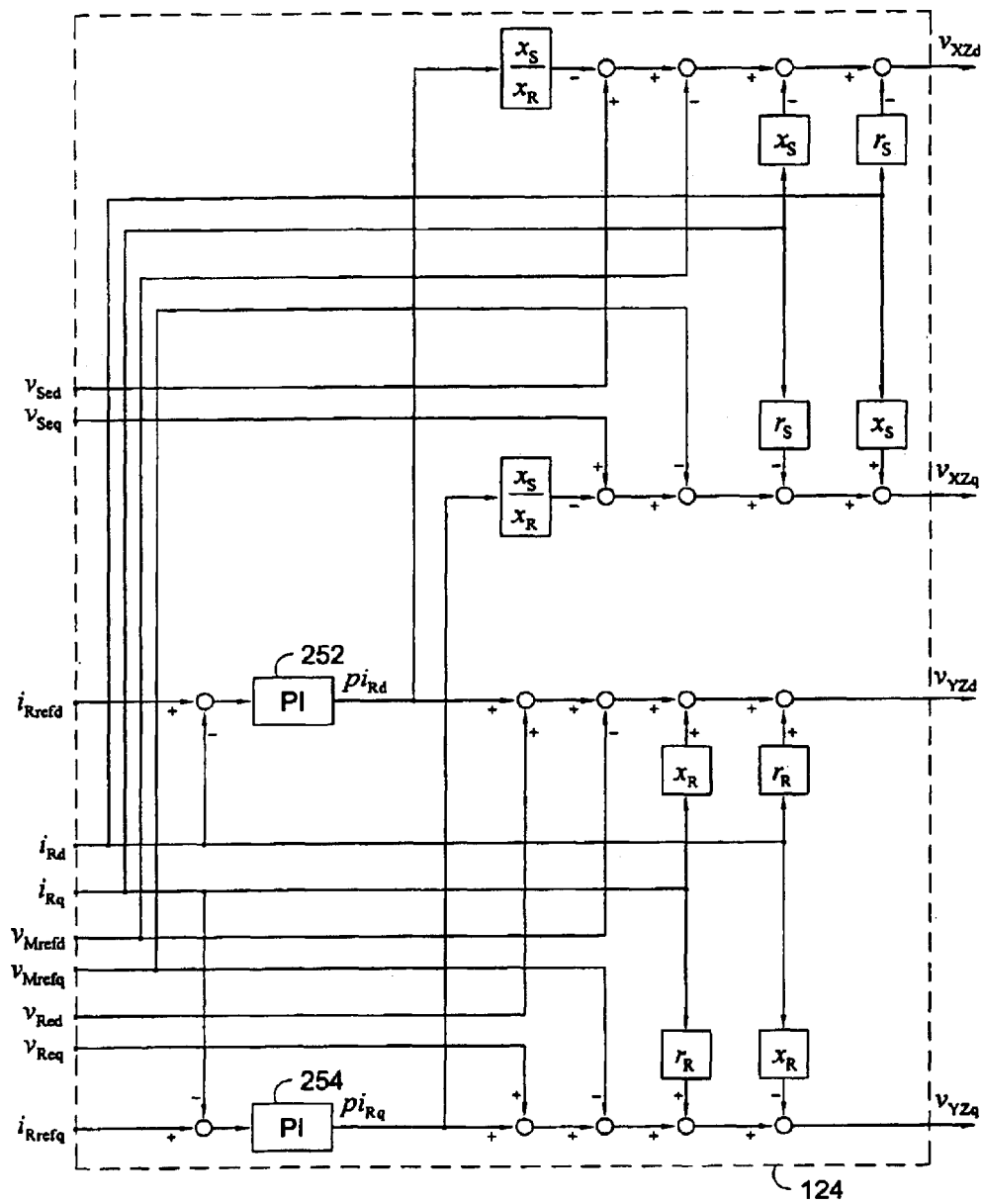

Finally, the current regulator 124 suitable for $B_M=0$ shall be reviewed. Since in this case there are only two states and four control variables it is possible to independently control $\vec{V}_M$ while controlling the dynamics of line currents. Actively controlling $\vec{V}_M$ is useful as it can position this vector in the desired orientation prior to transition into a different mode of operation, i.e., prior to engaging shunt susceptance 22. An example of controller structure suitable for this mode of operation is shown in FIG. 23.

Block 112 is responsible for supplying the current references to the current regulator 114. In principle the operation of this block is as follows. Signal $\vec{i}_{Rref}$ is computed based on the inputs $p_{2ref}$ and $q_{2ref}$, and the measured value of $\vec{v}_2$. Next, input $\vec{v}_{Mref}$ is used to compute $\vec{i}_{Mref}$ based on the known value of $b_M$. Finally, $\vec{i}_{Sref}$ is obtained as a vector sum of $\vec{i}_{Rref}$ and $\vec{i}_{Mref}$. This is the conceptual organization. Specific construction, however, has to deal with the variations in structure of the current controllers due to the changes in value of $b_M$, and to provide suitable inputs for correction of current references provided by the DC voltage controller.

Figure 24:
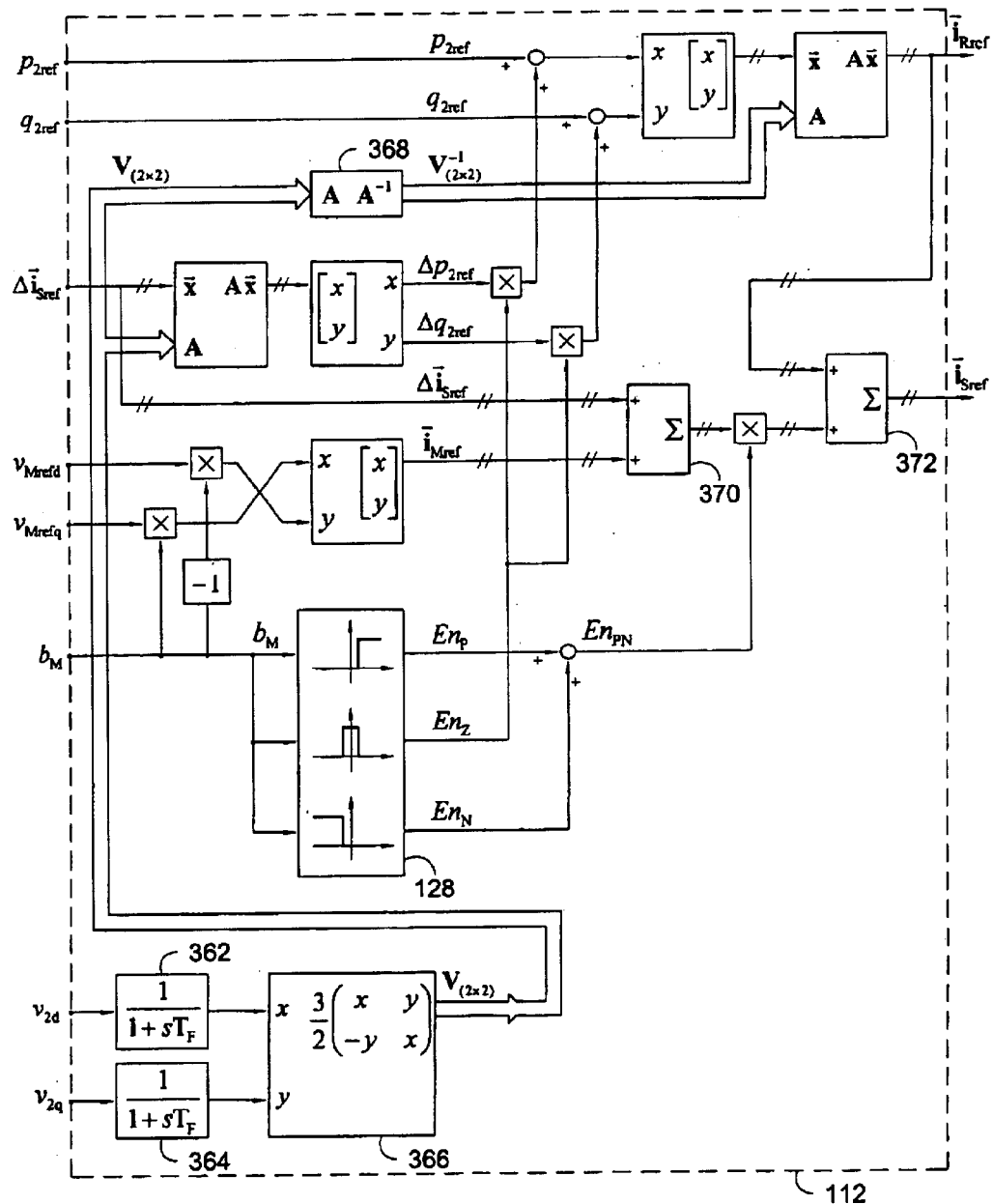

Detailed block diagram of the internal structure of current reference computer block 112 is shown in FIG. 24. A voltage matrix needed to compute $\vec{i}_{Rref}$ based on the values of $p_{2ref}$ and $q_{2ref}$ is generated as follows. Signals $v_{2d}$ and $V_{2q}$ are low-pass filtered in the blocks 362 and 364 and then fed into the matrix composition block 366. This voltage matrix is inverted in the block 368, and subsequently the inverse is used to compute $\vec{i}_{Rref}$. The time constant of these low-pass filters should be sufficiently higher than the time constant of the closed loop current controllers to suppress the influence of voltage dynamics on the signals comprising $\vec{i}_{Rref}$. The signal of $\vec{i}_{Mref}$ is composed directly based on the signals $v_{Mrefq}$, $v_{Mrefd}$ and $b_M$. The input signal $\Delta \vec{i}_{Sref}$ supplied by the DC voltage regulator is used to prepare the signals $\Delta p_{2ref}$ and $\Delta q_{2ref}$ (required to modify $p_{2ref}$ and $q_{2ref}$ when $b_M=0$), and added to the signal of $\vec{i}_{Mref}$ by way of block 370. Finally, $\vec{i}_{Sref}$ is obtained as a vector sum of $\vec{i}_{Rref}$ and modified value of $\vec{i}_{Mref}$ (when $b_M \neq 0$) by way of block 372.

It can be deduced based on this discussion that for $b_M \neq 0$ presence of $\Delta \vec{i}_{Sref}$ ultimately results in the steady state error of $\vec{v}_M$. Analogously, for $b_M=0$ presence of $\Delta \vec{i}_{Sref}$ results in the steady state error of $p_2$ and $q_2$. Allowing these relatively small inaccuracies permits a simple implementation of DC voltage controller without the need to accurately compute the reachable set lookup tables. Expressed in simplest terms, this approach allows the system to autonomously converge to the operating point near the operating point obtained from the lookup tables. This statement will become clearer during the following review of the DC voltage controller.

The voltage of the DC capacitors 44 is directly related to the power balance of voltage-sourced converters 36 and 38. The constraint of power balance and its equivalent formulations were discussed in the section that dealt with computing the set of permissible steady state operating points. To recapitulate, it was shown that the condition of power balance expressed by (4) can, in a lossless system, be replaced by (14). Next, the graphical interpretation of (14) was introduced, and the following derivation of permissible steady state operating points relied on maintaining the system on the manifold defined by (14), that is, on maintaining the current vectors $\vec{I}_S$ and $\vec{I}_R$ on their respective equal power lines.

It is important to emphasize that the above was deduced under the assumption of a lossless system, and that attempting to operate a real system without a strategy to maintain the charge of the DC capacitors would result in depleting the charge and thus disabling the converters. In this section, a strategy for controlling the charge of DC caps will be discussed using already introduced geometric concepts.

Figure 25A:
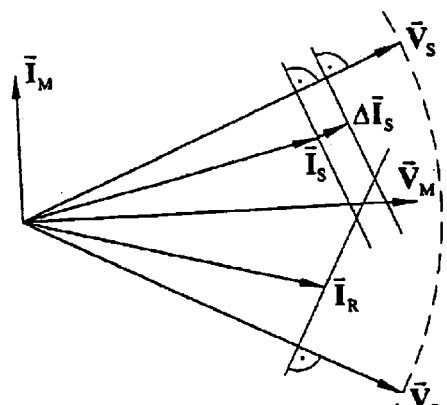

A procedure for finding the steady state operating point of a lossless system was presented using FIG. 8 and explained in the related discussion. In short, the procedure started by assuming that the desired power transfer and $\vec{V}_M$ are known, and based on the known value of $B_M$ a unique solution for the vectors of line currents was found. The tips of the resulting current vectors $\vec{I}_S$ and $\vec{I}_R$ lie on the respective equal power lines. If it is now assumed that closed loop control of current is operational, and that the steady state value of voltage vector $\vec{V}_M$ is unchanged, the existence of losses will result in gradual reduction of charge on the DC capacitor. This conclusion flows from the law of conservation of energy for the system of FIG. 2. Consequently, in order to maintain the constant charge on the DC capacitors it is necessary to alter the power balance between the sending and receiving end of the line. One way to achieve this is to increase $\vec{I}_S$ in the direction of $\vec{V}_S$, while maintaining $\vec{I}_R$ at the original value. Geometric interpretation of this change is shown in FIG. 25A. Equivalent solutions for altering the power balance include modifying the current vector $\vec{I}_R$ in the direction opposite to that of vector $\vec{V}_R$ while keeping the vector $\vec{I}_S$ unchanged, or changing both vectors simultaneously in the corresponding directions. For simplicity, and compatibility with already discussed block diagrams, further discussion will assume that $V_{DC}$ is controlled by changing only the vector $\vec{I}_S$.

Figure 25B:
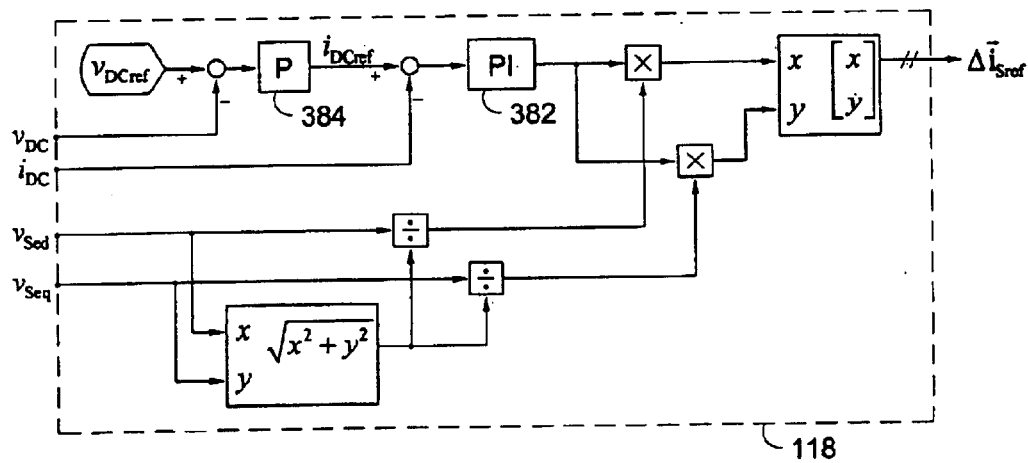

Control block 118 (shown in FIG. 16) provides the DC voltage control. A possible internal structure of this block is shown in FIG. 25B. The DC voltage regulator consists of the inner loop that controls $i_{DC}$ using the PI block 382. Output of this PI block is multiplied by the d-q components of the unit vector oriented in the direction of $\vec{V}_{Se}$. Using the estimate instead of the measured value is possible, as even the crude estimate will have the appropriate orientation. The only downside is that if the estimate of voltage is incorrect, resulting change of $\vec{I}_S$ will not be of minimal magnitude; nonetheless, integral element in 382 will adjust to achieve zero error in $i_{DC}$. Outer loop controlling the voltage on the DC capacitors has only the proportional gain element 384. This is sufficient since the plant (DC capacitor) is an integrator. The required incremental change of $\vec{I}_S$ is identified as $\Delta \vec{i}_{Sref}$ in FIG. 25B. This signal is used within the current reference computer, block 112, as was already explained.

It will be understood that the controller structure presented here is provided for illustration only. Voltage on the DC capacitors is controlled by altering the power balance between the sending and receiving end of the line. This permits a simple implementation of the DC voltage controller that is essentially decoupled from the current regulators. Consequently, the overall control system is structured and relatively simple to design. Those experienced in the art will now appreciate that such structuring of the DC voltage regulator permits the system to temporarily depart from the manifold of equal power exchange (during transients) and return to it in steady state.

Finally, for completeness it should be appreciated that an initial charge of DC capacitors permits the operation of the voltage-sourced converters 36 and 38. This initial charge can be provided by an auxiliary circuit of small ratings that will be disconnected once the converters are started. A person of ordinary skill should now readily appreciate that numerous modifications to the above embodiments are possible.

Alternate example embodiments of a power flow controller are illustrated in FIGS. 26–31.

Figure 26A:
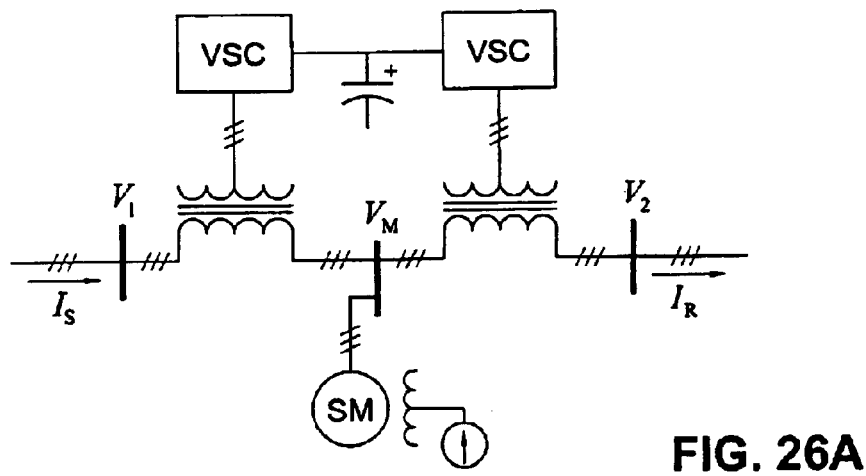
FIGS. 26A–31 illustrate alternate power flow controllers, exemplary of further embodiments of the present invention.
Figure 26B:
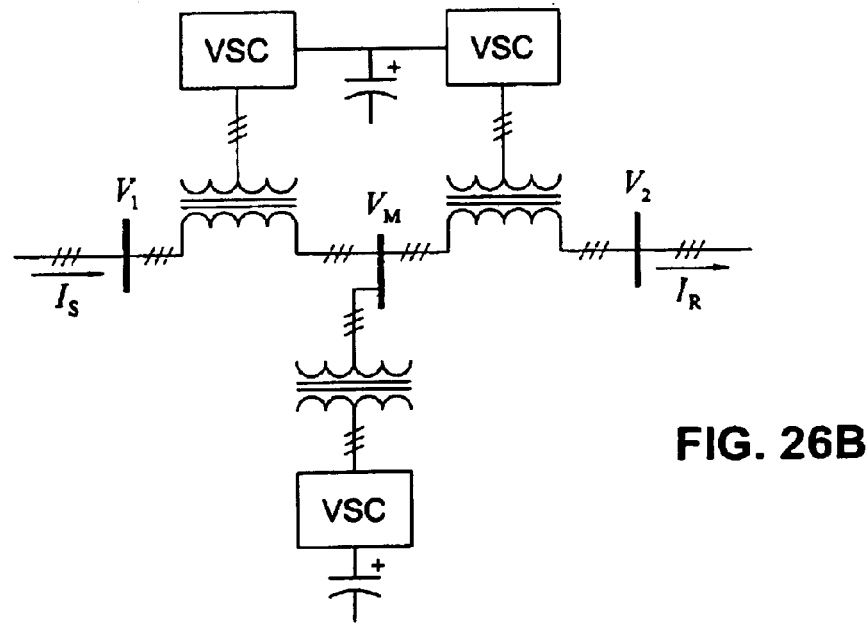

As illustrated, power flow controllers exemplary of other embodiments of the present invention could be formed using a synchronous condenser, as shown in FIG. 26A, or a STATCOM, as shown in FIG. 26B.

Figure 26C:
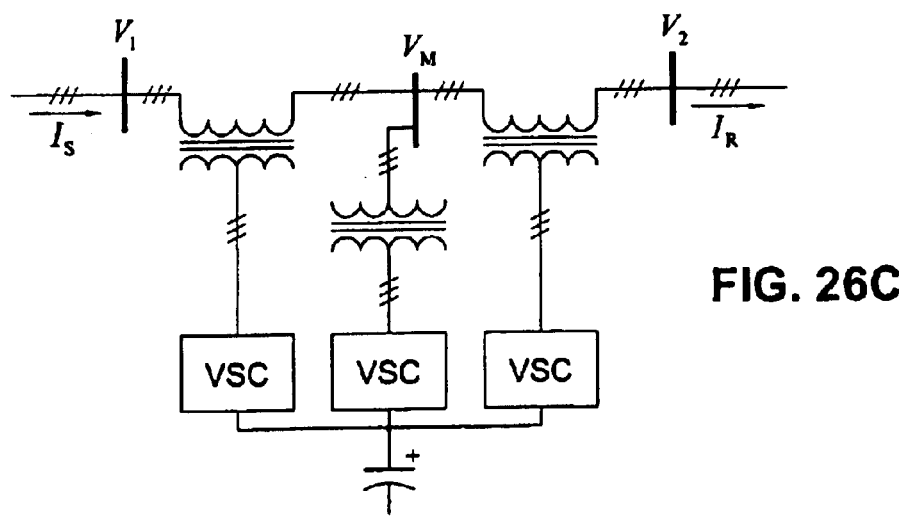
Figure 27A:
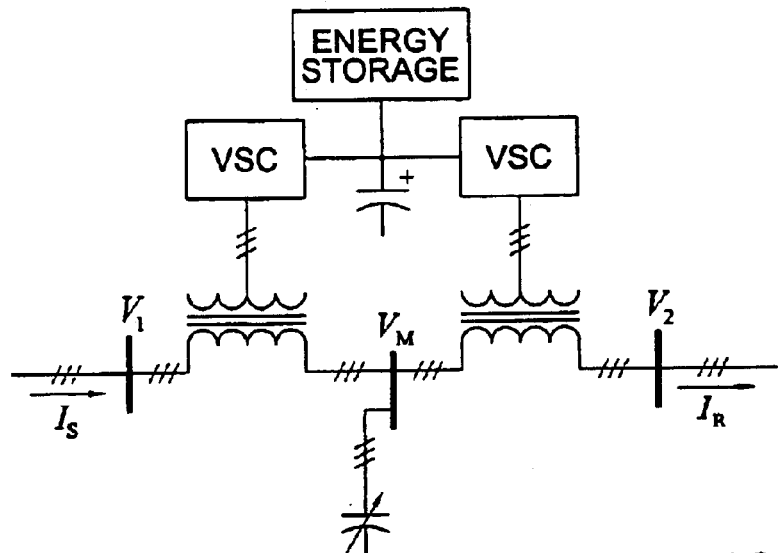
Figure 27B:
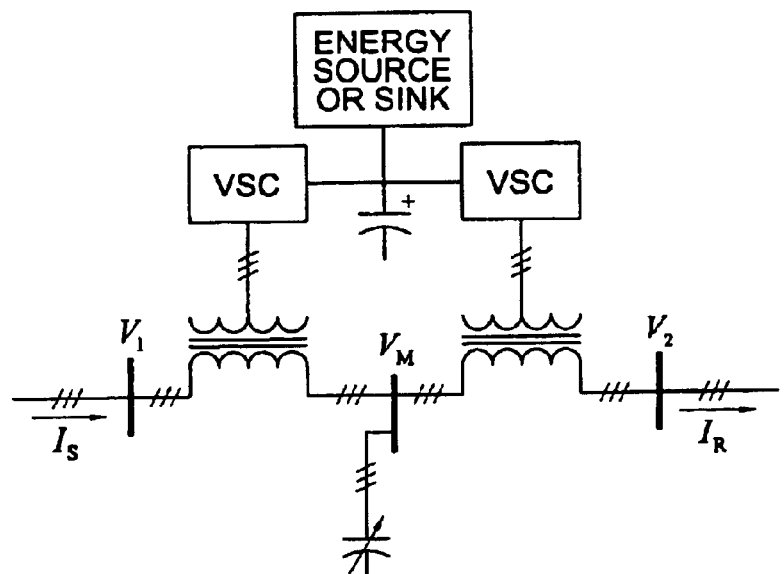

If a STATCOM is used to implement the midpoint susceptance, a modest improvement in operating range could be realized by connecting all converters to a common DC bus, as shown in FIG. 26C. Augmenting energy storage on the DC bus of an exemplary power converter allows the power flow controller to transiently consume or supply active power, by exchanging energy with the storage device. This is further exemplified in the embodiment of FIG. 27A. Active power exchange may be realized between one or both of the converters and the network. Through active power exchange, the system transient response would be improved. The long term steady state operation would remain unchanged. Net energy exchange between the power flow controller and the system could also be realized. This is depicted in FIG. 27B where a source or sink of power is connected to the DC bus. Modification of the DC voltage control circuit to accommodate dynamic or static energy exchange with the DC link will be readily appreciated by a person of ordinary skill.

Figure 28A:
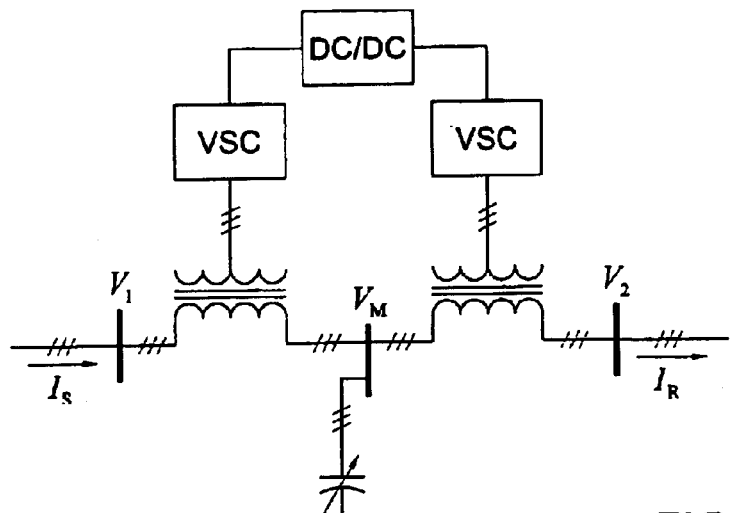
Figure 28B:
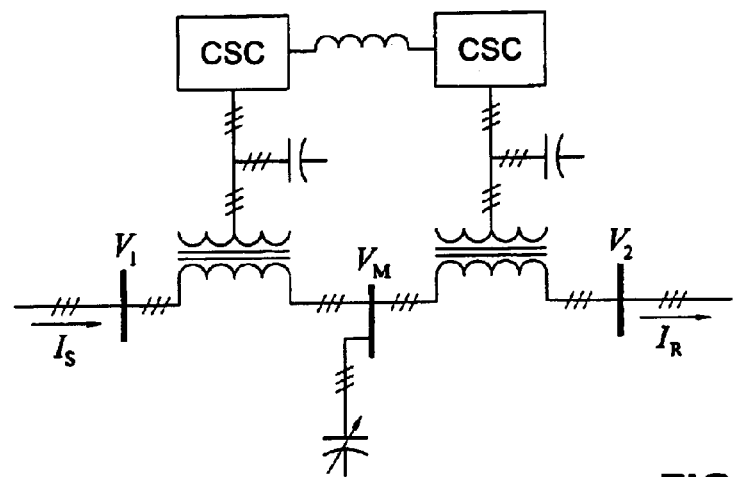
Figure 28C:
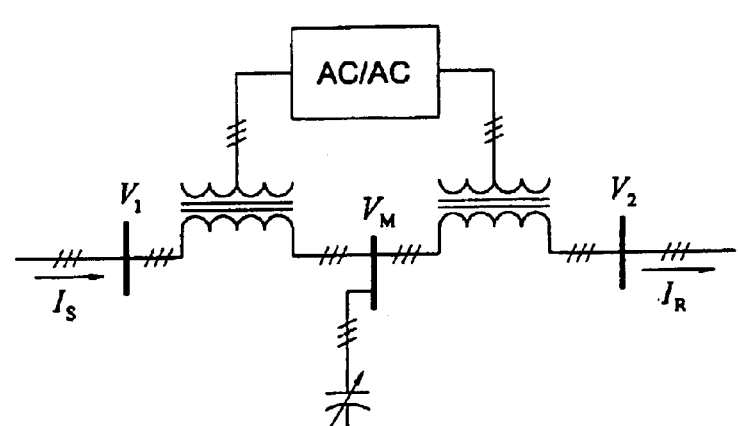

A power flow converter exemplary of the present invention may easily be implemented with a host of alternative converter technologies. Three other possible configuration are shown in FIG. 28A–28C. FIG. 28A depicts a configuration where power exchange between the converters is facilitated using a DC to DC converter. FIG. 28B depicts a power flow converter implemented using current-sourced converters. Although voltage controlled sources are replaced with current controlled sources only minor reformulation of an associated controller is required to accommodate the current-sourced converters. The overall operating principle remains substantially the same.

FIG. 28C depicts the use of a direct ac-to-ac converter system to provide the two controllable sources of the power flow converter. Again, low-level controls would require modification, however, the overall operating principle is unchanged.

Figure 29A:
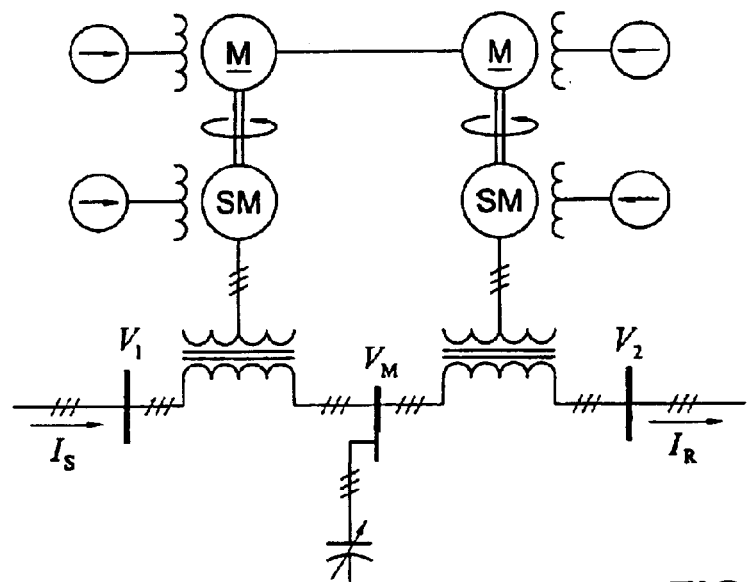
Figure 29B:
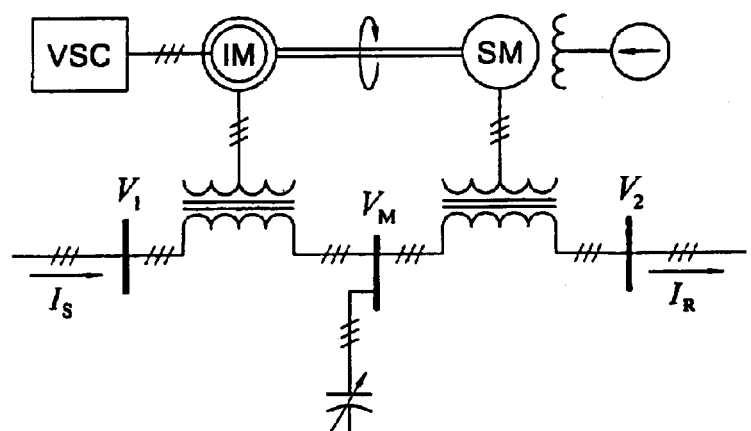

In place of using the described converters 36, 38 to supply the controllable sources of the controller 14, various electromechanical converters could alternatively be used. Two possible configurations that employ machines to generate the controlled sources are illustrated in FIGS. 29A and 29B. In the embodiment of FIG. 29A, synchronous machines supply the controlled voltages. The voltage amplitudes may be regulated through their individual exciter controls. Each synchronous machine is mechanically coupled to a DC machine. DC machine regulation may then be used to transfer a desired amount of active power from one controlled source to the other. Advantageously, the configuration inherently ensures that power balance is met. Conveniently, therefore, no external power balancing control action is required. Due to the inherent power balance, regulation of the controlled voltage amplitudes, together with the power flow control between the sources, allows full control of the controller. FIG. 29B depicts a similar configuration that employs a reduced number of machines. A doubly fed induction machine is used to replace one synchronous machine, both dc machines, and the electrical tie between the dc machines. Excitation control of the induction machine may be employed to both vary the amplitude of the controlled source and adjust the power flow between sources. Power balance is, again, inherently ensured.

Figure 30:
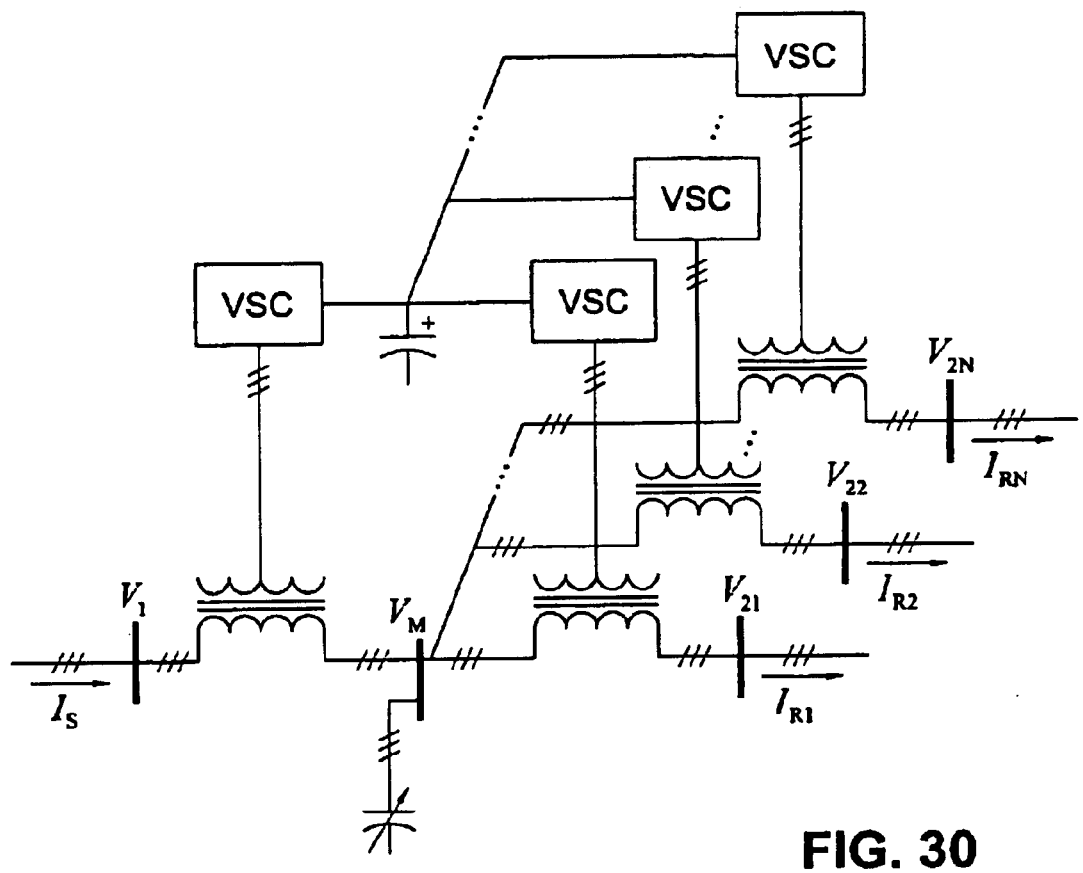

FIG. 30 represents a multi-terminal power flow controller with N+1 transmission line segments. In an N+1 terminal power flow controller, N active power flows may be independently controlled. Power balance only requires that the sum of all converter powers be substantially zero (less any losses). All N+1 reactive powers flowing in the transmission line segments may also be controlled. FIG. 30 gives one particular multi-terminal configuration, where there is one sending end network and N receiving end networks. In this case, powers to receiving ends are independently controlled while the converter on the sending end transmission line segment ensures power balance is achieved. Again, reactive power flows in all transmission line segments may be independently controlled. Midpoint capacitor voltage stabilization can be achieved in the same fashion as with the power flow controller 14 of FIG. 1.

Figure 31:
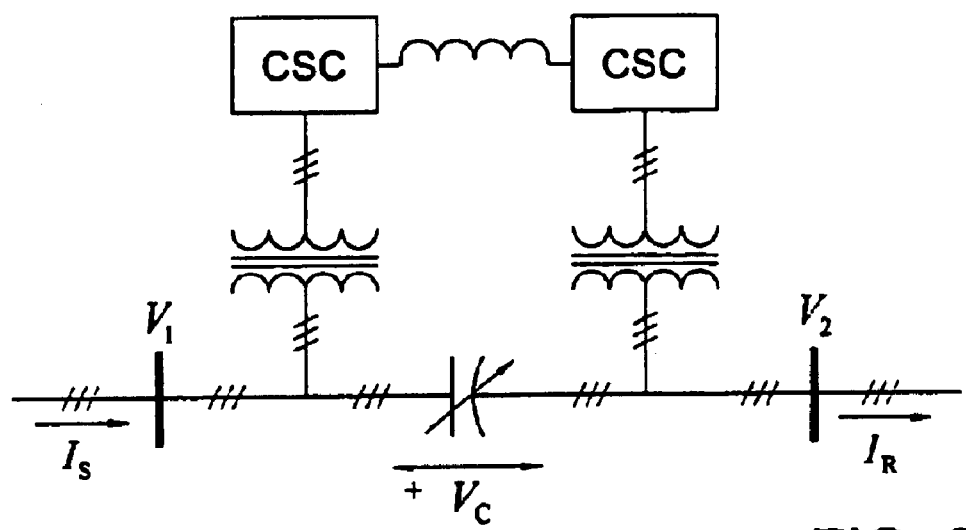

FIG. 31 illustrates a dual circuit to the power flow controller of FIG. 1, that can be obtained by wye to delta transformation of the power flow controller 14 of FIG. 1.

The controlled sources are now shunt connected current-sourced converters and the central susceptance is transformed into series connected reactance. As in the original configuration, the requirement for power balance between the converters exists here as well, and can be achieved by using an appropriate control algorithm. This circuit too has a number of simpler equivalents; using voltage-sourced converters in place of current-sourced converters is one variant.

From the foregoing, a person of ordinary skill will readily appreciate that any number of known power converters and passive electric components may be used and combined to form a power flow controller exemplary of the present invention. Voltage, current and electromechanical converters may be combined to form a suitable power flow controller.

From the discussion of power flow controllers 14, and the variants depicted in FIGS. 26A–31, it should be apparent that the example power flow controllers divert a controlled amount of active power (P1) from electrical region 10 to their input and provide this active power to a second electrical region. Within the power flow controllers, the diverted active power is provided in part to a first power converter (e.g. converter 36 of FIG. 1; the leftmost voltage-sourced converter of FIGS. 26A, 26B, 26C, 27A, 27B, 28A, 30; the leftmost current-sourced converter of FIG. 28B, the AC/AC converter of FIG. 28C; and the leftmost electromechanical power converter of FIGS. 29A; 29B), and in part to the remainder of the power controller. The amount of active electrical power provided to the first power converter is controlled, and influences the total active power diverted to the power flow controller. The active power provided to the power converter is, in turn, provided to the output of the controller (by way of converter 38 of FIG. 1; the rightmost voltage-sourced converter of FIGS. 26A, 26B, 26C, 27A, 27B, 28A, 30; the rightmost current sourced converter of FIG. 28B; the AC/AC converter of FIG. 28C; and the rightmost electromechanical power converter of FIGS. 29A; 29B) along with the remaining active power at the input. In order to allow flexible control of the amount of active power diverted to the first power converter, a portion of the input current is diverted through a susceptance/reactance or its equivalent. This diverted current, ensures that the current provided at the output of the power flow controller need not be in phase with the current provided at its input, effectively decoupling these two currents for control purposes. Current diverted to the input of the power flow controller may be controlled substantially independently of the current at the output of power flow controller. Conveniently, a controllable quantity ($Q_1$) of reactive power may also be provided by the power flow controller at its input, while another controllable quantity ($Q_2$) of reactive power may be provided from the power flow controller at the output. Advantageously, the active power provided to/from the controller (i.e. $P_1=P_2$) and the reactive power provided by the controller to its input and output (i.e. $Q_1$, $Q_2$) may be independently controlled.

The delta connected analog to the described power flow controller is depicted in FIG. 31. Power at the input node is diverted by diverting a current through the leftmost shunt connected power converter. This power is provided to the output of the power flow controller by the rightmost shunt connected converter. A reactance between input and output nodes of the controller ensures that the potential difference at these nodes may be controlled to a desired value by coordinated control of the converters, and essentially independently of the current diverted to the power flow controller. Of course, the power balance between the input and output of the power flow controller will be maintained in steady state operation.

As should now also be appreciated, in the described embodiments, only a portion of the active power provided to the exemplary power flow controllers is diverted through the first power converter. The ratings of the power converters may be significantly smaller that the total apparent power diverted by the power flow controller.

Further, exemplary power converters may be formed using conventional, existing variable susceptance(s). Power distribution network operators may thus form exemplary power flow converters using at least one conventional, existing component (e.g. a variable susceptance 22).

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of providing a desired amount of active power from a first electrical region to a second electrical region, said method comprising:

diverting a current from said first region to an input of a first controlled voltage source, said input at an input voltage;

adding to said input voltage, using said first controlled voltage source a first control voltage at a controlled amplitude and phase angle to provide an intermediate voltage at an output of said first controlled voltage source;

diverting a current, from said output of said first controlled voltage source;

adding to said intermediate voltage, using a second controlled voltage source a second control voltage at a controlled amplitude and phase angle to provide from an output of said second controlled voltage source a current to said second region;

providing active power for said second controlled voltage source from said first controlled voltage source;

controlling said first and second control voltages in magnitude and phase to provide said desired amount of active power to said second region, and so that substantially all active power provided to said first controlled voltage source is coupled to said second voltage source.

2. The method of claim 1, wherein said diverting a current, comprises diverting a current through an adjustable susceptance.

3. The method of claim 2, further comprising storing sets of operating points for controlling said first and second voltage sources, choosing one of said sets of operating points to provide said desired active power, and controlling said first and second control voltages to provide said desired amount of active power while maintaining said one of said sets of operating points.

4. The method of claim 3, further comprising controlling a value of said adjustable susceptance.

5. The method of claim 2, further comprising controlling a voltage at said susceptance, in order to control current diverted through said susceptance.

6. The method of claim 1, wherein said first and second controlled voltage sources are coupled to each other by an energy storage device, and further comprising controlling an average energy in said energy storage device to remain constant.

7. The method of claim 6, wherein said controlling an average energy comprises controlling current to said input to maintain said average energy stored in said energy storage device, thereby compensating for losses in said providing.

8. The method of claim 6, wherein said energy storage device comprises a capacitor, and wherein said controlling average energy in said energy storage device to remain constant comprises controlling said first and second control voltages to maintain a DC voltage across said capacitor.

9. The method of claim 1, further comprising controlling said first and second control voltages in magnitude and phase to provide a desired reactive power from an output of said second controlled voltage source.

10. The method of claim 1, further comprising controlling said first and second control voltages in magnitude and phase to obtain a desired reactive power from an input of said first controlled voltage source.

11. A method of diverting a controlled quantity of active electrical power from a first electrical region to a second electrical region, said method comprising:
   providing said active electrical power to an input of a power flow controller;
   diverting a portion of said active electrical power provided to said input to a first power converter;
   providing a remaining portion of said active electrical power from said input to an output of said power flow controller;
   providing active power from said first power converter to said output of said power flow controller and thereby to said second electrical region;
   varying a phase angle of electrical current at said output relative to said input by providing current from said input to an intermediate node, and diverting a portion of said current at said intermediate node through a susceptance
   controlling said first power converter, so that said desired quantity of active electrical power is diverted from said first electrical region to said second electrical region.

12. The method of claim 11, wherein said active power from said first power converter is provided to said output by a second power converter coupled to said first power converter.

13. The method of claim 12, further comprising controlling said second power converter to couple substantially all of said active power from said first power converter to said output.

14. The method of claim 11, further comprises controlling said first and second power converters to divert a first controlled amount of reactive power to said power flow controller.

15. The method of claim 14, further comprising controlling said first and second power converter to provide a second controlled reactive power to said output.

16. An electrical power flow controller comprising:
   an input and an output;
   a first power converter and a second power converter connected in series to each other between said input and output;
   a susceptance connected in shunt to a node between said first power converter and said second power converter;
   a controller in communication with said first power converter and said second power converter, said controller operable to control said first power converter and said second power converter to provide a controlled quantity of active power to said output, and draw said controlled quantity of active power from said input.

17. The electrical power flow converter of claim 16, wherein said first power converter comprises a transformer coupled voltage-sourced converter.

18. The electrical power flow converter of claim 17, wherein said second power converter comprises a transformer coupled second voltage-sourced converter.

19. The electrical power flow converter of claim 16, wherein said first power converter is a first electromechanical power converter and said second power converter is a second electromechanical power converter; said second electromechanical power converter coupled to said first electromechanical power converter to exchange active power.

20. The electrical power flow controller of claim 17, wherein said controller is operable to control said first power converter and said second power converter to provide a first controlled amount of reactive power at said input terminals.

21. The electrical power flow controller of claim 17, wherein said controller is operable to control said first and second power converters to provide a second controlled amount of reactive power at said output terminals.

22. An electrical power flow controller comprising:
   an input and output;
   a reactance connected in series between said input and said output;
   a first set of terminals connected in shunt with said input and coupling a first power converter;
   a second set of terminals connected in shunt with said output and coupling a second power converter;
   said first power converter coupled to provide active power to said second power converter;
   a controller in communication with said first and second power converters;
   said controller operable to control said first and second power converters to provide a controlled quantity of active power from said output, and draw said controlled quantity of active power from said input.

23. The electric power flow controller of claim 22, further comprising an energy storage device coupling said first power converter to said second power converter, and wherein said controller is further operable to control current from said input to maintain an energy stored in said energy storage device, thereby compensating for losses in said electrical power flow controller.

24. A power flow control circuit for diverting electrical power from a first region to provide a controlled amount of active power to a second region, said power flow control circuit comprising
   a first controllable voltage source providing a first controllable voltage between its input and its output, wherein its input is for interconnection to said first region;
   a second controllable voltage source providing a second controllable voltage between its input and its output, wherein its output is for connection to said second region;
   said output of said first controllable voltage source connected to said input of said second controllable voltage source;
   an impedance connected in shunt to a node between said output of said first power converting circuit;
   said second controllable voltage source coupled to said first controllable voltage source to obtain active power from said first controllable voltage source;
   a controller in communication with said first and second controllable voltage sources to control said first and second controllable voltages to provide said active power to said second region from power from said first region, and to couple substantially all active power provided to said first controlled voltage source to said second voltage source.

25. A method of compensating electrical losses in an electrical power flow controller, said power flow controller comprising first and second power converters for diverting a controlled quantity of active electrical power from a first electrical region to an input of said power flow controller and from an output of said power flow converter to a second electrical region, said first and second power converters coupled to each other through an energy storage device to exchange energy between said first and second power converters, said method comprising:

controlling current to said input to maintain an energy stored in said energy storage device, thereby compensating for losses in said electrical power flow controller.

* * * * *